United States Patent [19]

Koutsoupidis

[11] Patent Number: 5,246,188
[45] Date of Patent: Sep. 21, 1993

[54] WING TURBINES IN CONJUCTION WITH PROPULSION SYSTEMS FOR AIRCRAFT AND HELICOPTERS

[76] Inventor: Theodore K. Koutsoupidis, 8581 Tyrolean Way, Springfield, Va. 22153

[21] Appl. No.: 407,313

[22] Filed: Sep. 14, 1989

[51] Int. Cl.⁵ .............................................. B64C 29/00
[52] U.S. Cl. ................................... 244/7 R; 244/12.3; 244/23 B; 244/207
[58] Field of Search ................ 244/6, 7 R, 7 A, 12.1, 244/12.3, 23 B, 17.11, 207, 91, 55; 416/20 R, 171, 169 R, 143

[56] References Cited

U.S. PATENT DOCUMENTS

| | | | |
|---|---|---|---|
| 1,943,290 | 1/1934 | Clarke | 244/6 |
| 2,595,363 | 5/1952 | Lee | 244/91 |
| 2,989,268 | 6/1961 | Andrews | 416/20 |
| 2,989,843 | 6/1961 | Ferri | 416/171 |
| 2,990,138 | 6/1961 | Shaw | 416/171 |
| 3,120,362 | 2/1964 | Curtis et al. | 244/12.3 |
| 3,207,457 | 9/1965 | Kisovec | 244/7 A |
| 3,267,668 | 8/1966 | Erwin | 244/23 B |
| 3,368,778 | 2/1968 | Wilde et al. | 244/6 |
| 3,381,474 | 5/1968 | Gist, Jr. | 244/12.3 |
| 3,484,175 | 12/1969 | Vacca et al. | 244/7 R |
| 3,900,176 | 8/1975 | Everett | 244/6 |
| 3,934,844 | 1/1976 | Reighart, II | 244/199 |
| 4,678,401 | 7/1987 | Bradford et al. | 416/143 |

FOREIGN PATENT DOCUMENTS

| | | | |
|---|---|---|---|
| 940905 | 1/1974 | Canada | 244/12.3 |
| 546993 | 3/1932 | Fed. Rep. of Germany | 244/91 |
| 959441 | 3/1950 | France | 244/6 |
| 36633 | 9/1935 | Netherlands | 244/6 |

Primary Examiner—Galen Barefoot

[57] ABSTRACT

An aircraft may have vertical take-off and landing capability including a power-generating mechanism, a propulsion-developing mechanism, and laterally extending wings. Each wing includes an aerodynamically composite airfoil having a lower camber possessing an aerodynamic thrust-flap. A rotor is provided at the free end of each wing for rotating in a plane parallel to the plane of the wing. The lower surface of each wing includes thrust flap aerofoils which may be moved to shape a convergent-divergent nozzle and with the cooperation of the rotor to produce thrust. The rotor is driven by a wing turbine embodied in the wing. Any combination of different power plants provides the initial stage of compressed air to the wing turbine and/or motive fluid.

5 Claims, 12 Drawing Sheets

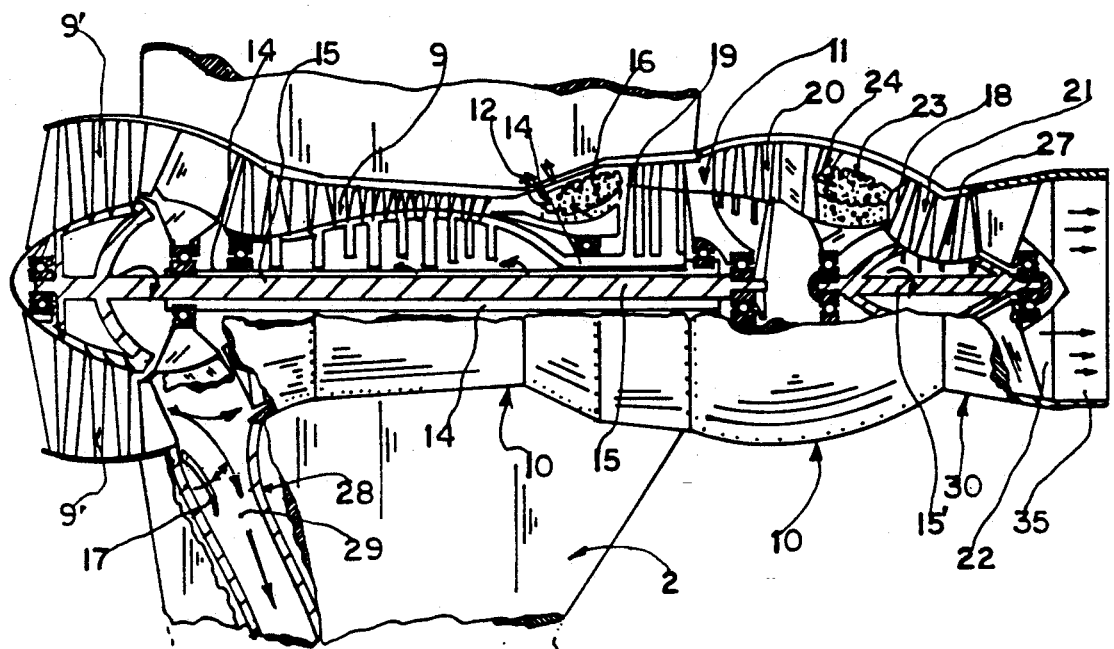
FIG. 1
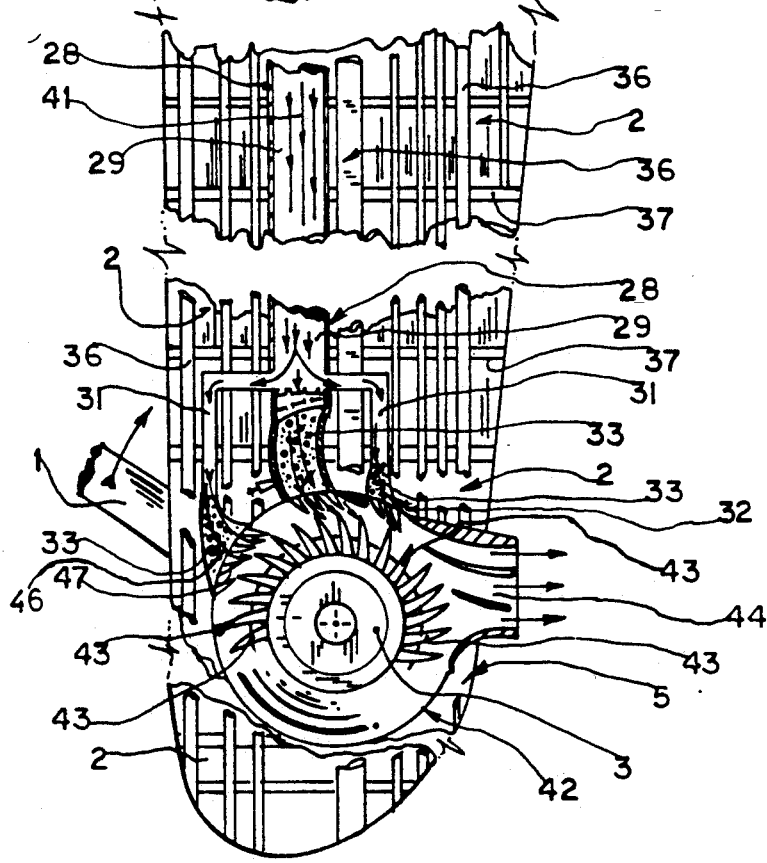

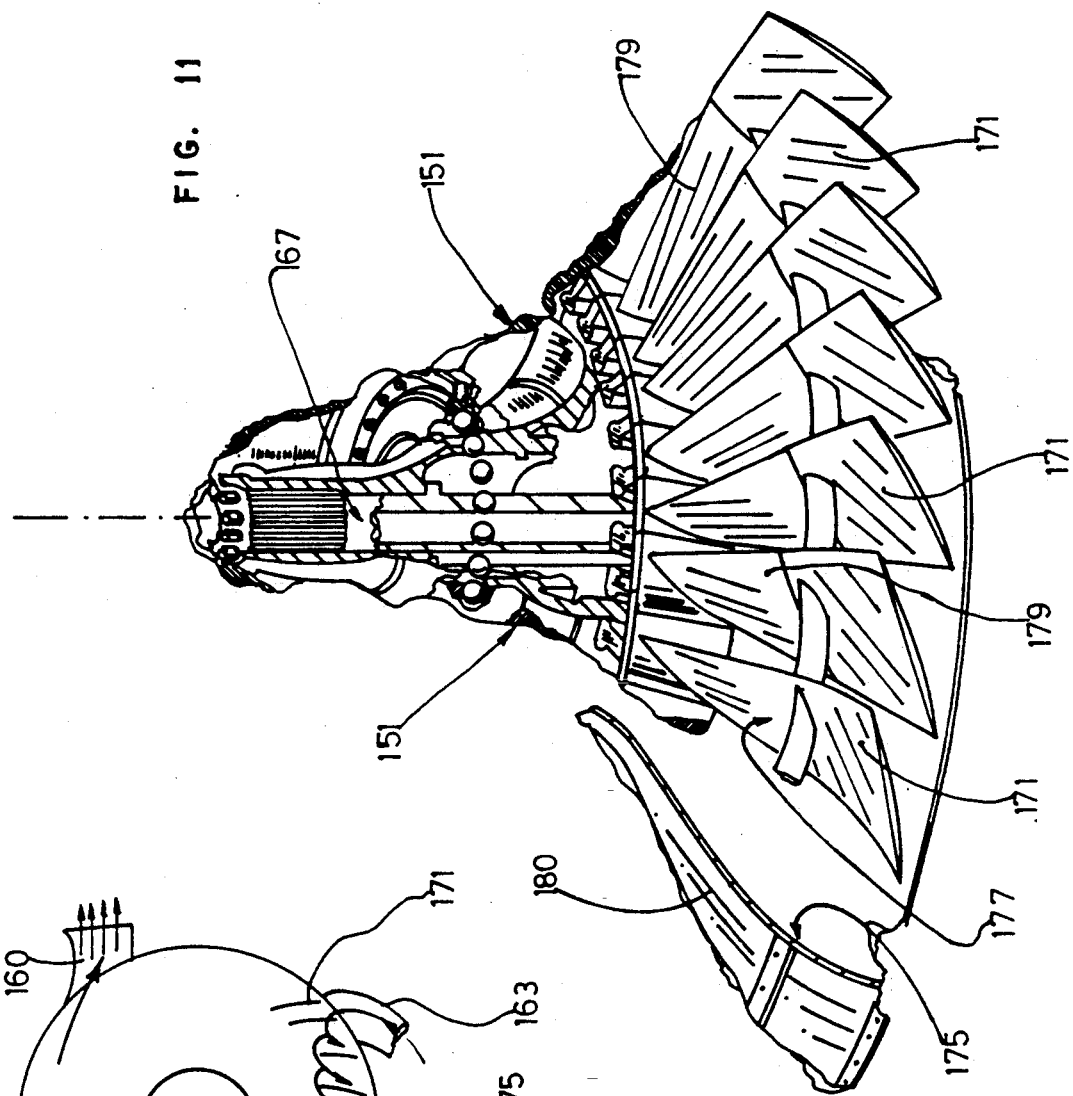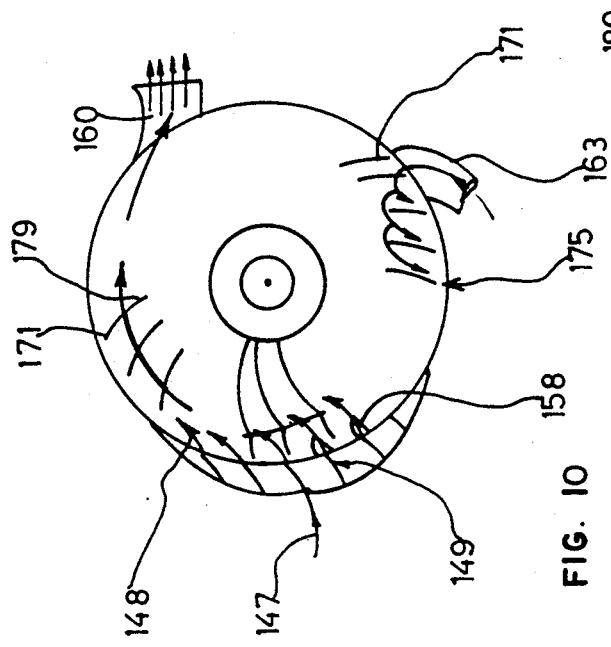

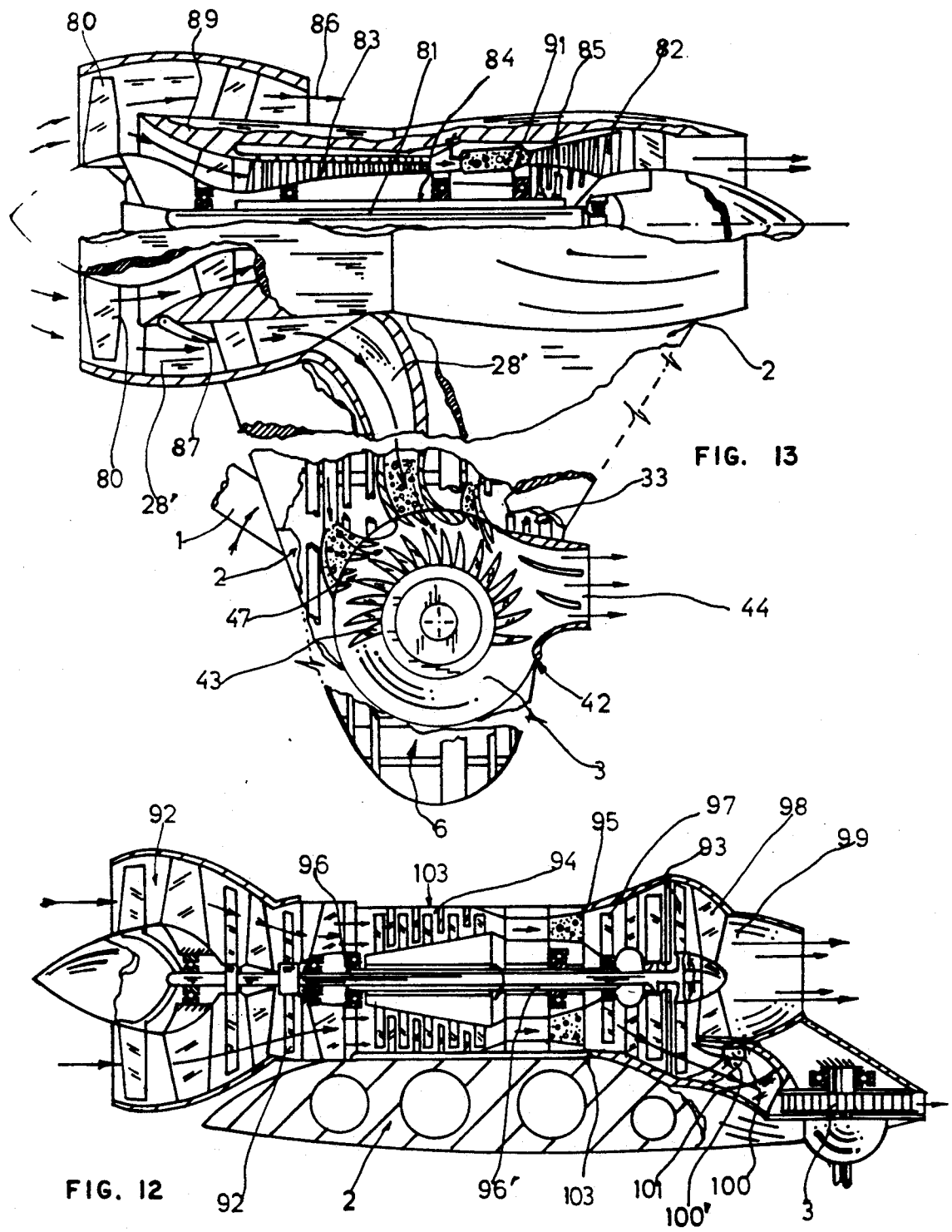

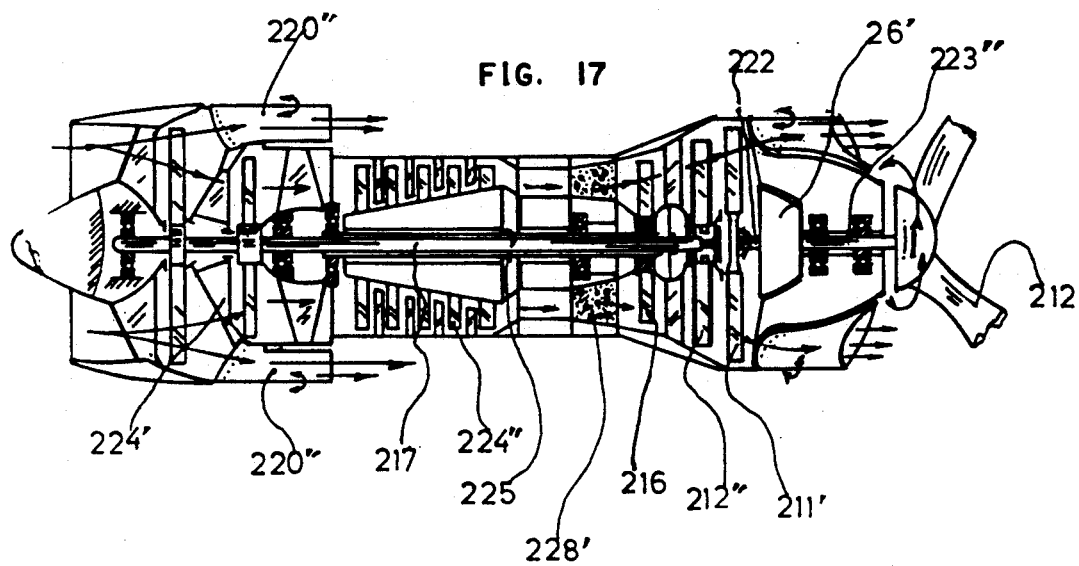
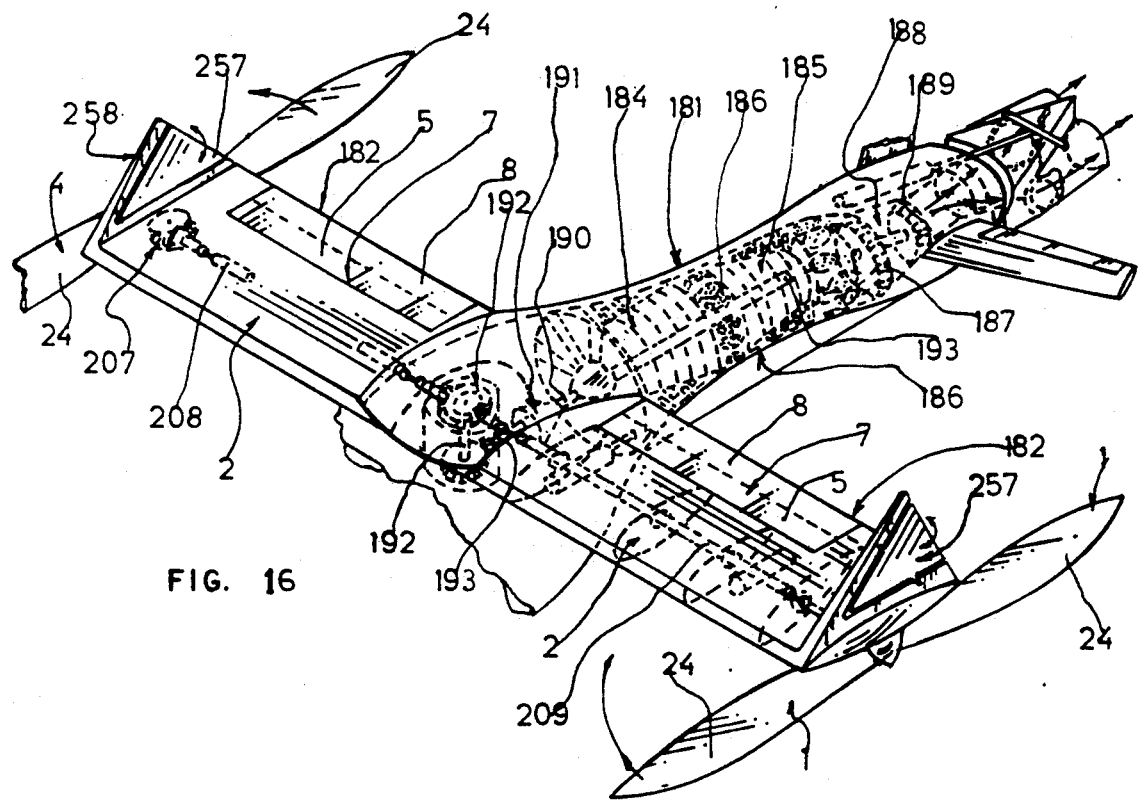

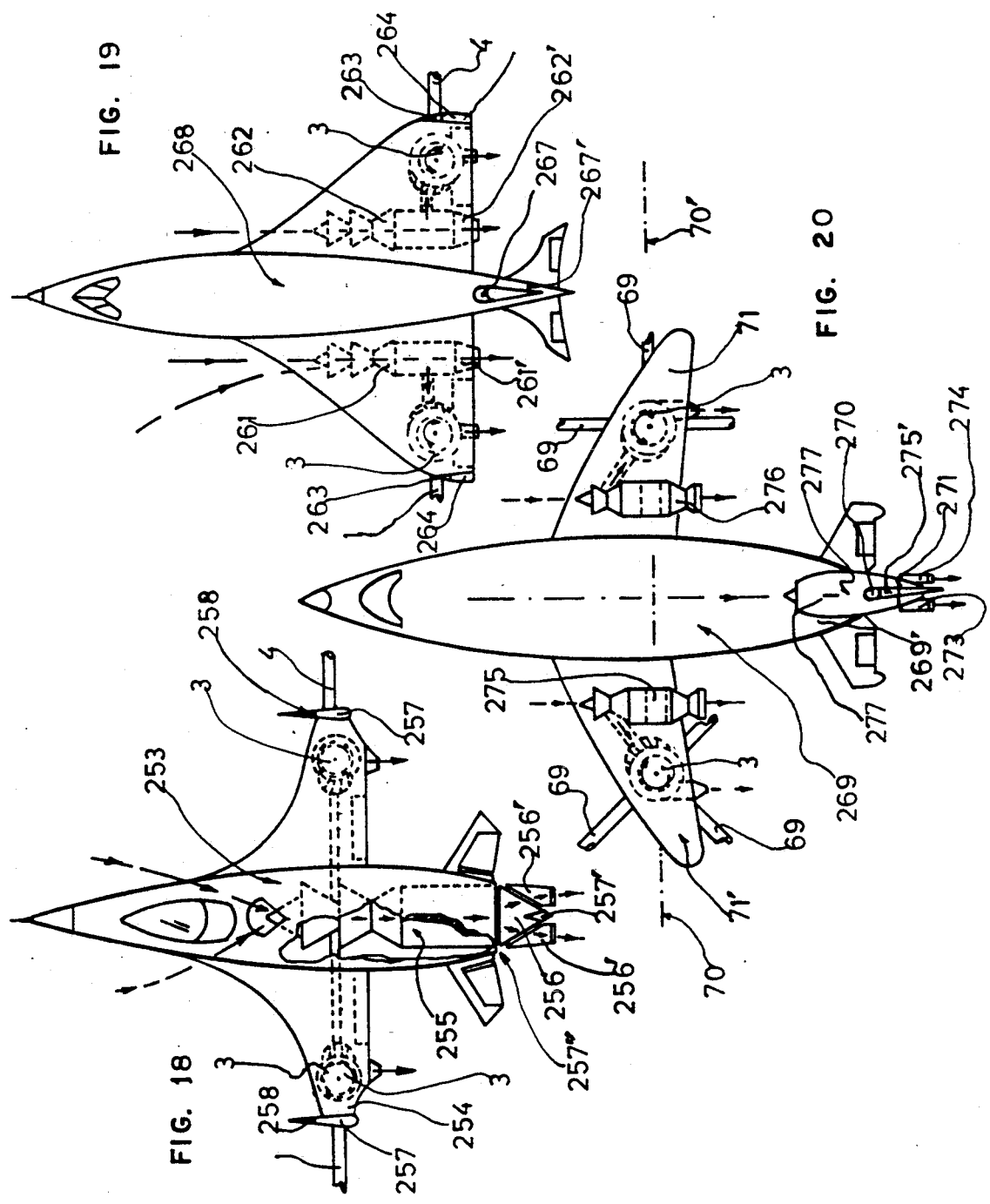

WING TURBINES IN CONJUCTION WITH PROPULSION SYSTEMS FOR AIRCRAFT AND HELICOPTERS

BACKGROUND OF THE INVENTION

1. Field of the Invention

The present invention relates to aircraft, such as airplanes and helicopters, and more particularly to a VTOL aircraft having a wing including a rotor supported on the tip of each wing laterally rotating and towards the longitudinal axis of said Craft's wings to generate lift for vertical take off or landing (V.T.O.L.) and thrust-flap to generate thrust between the wing's aerofoil and the rotors. The rotors are driven by means of wing-turbine supported on the tip of each wing rotating parallel to the rotors.

The present invention relates to VTOL Aircraft U.S. Pat. No. 4,789,115.

The invention relates generally to devices and/or systems for gas propulsion systems for driving rotors and contributing to the thrust by fluid reaction.

The invention provides an arrangement whereby the aircraft is efficiently propelled by a combination of rotors and a jet reaction thrust or/and jet propulsion.

2. Description of the Prior Art

Previous efforts to provide propulsion systems for propulsion of aircrafts by a combination of propeller and jet reaction thrust, as far as I am cognizant, such systems for gas propulsion by a combination of propellers and jet propulsion are now in existence, and are all characterized by having a propeller driven by the gas turbine or jet reaction apparatus through a shaft which is connected directly to the composite compressor-turbine shaft by gearing. Such systems have for one reason or another, well known to those skilled in this particular art, certain disadvantages.

It is therefore an object of this invention to provide a combination propeller thrust and jet thrust propulsion system for aircraft which will have a horsepower output of greater flexibility, and which will otherwise fulfill all requirements of turbine systems and nozzle parameters for providing propulsion by a combination of rotors, wing turbine, thrust-flaps and jet reaction. It is also clear that a long and unfilled need in the prior art has existed for a power plant to drive rotors supported on the tip of the wing.

SUMMARY OF THE INVENTION

Accordingly, it is an object of the present invention to provide a superior wing for an aircraft, by improving the U.S. Pat. No. 4,789,115. The wing, in conjunction with the rotor, thrust-flap, wing turbine and wing turbine-brake generates lift and thrust simultaneous or independently.

A further object of this invention is to provide a wing turbine. The wing tip includes a wing turbine supported horinzontally in the wing frame of the aircraft. The rotor is driven through a shaft connected directly to the wing turbine. The rotor is rotating parallel to the wing turbine.

Another object of this invention is to provide a wing turbine brake to stop the rotation of the rotor preferably parallel to the wing.

A still further object of this invention is to provide a turbine engine to drive the wing turbine. The main stream the jet reaction generated by a gas turbine or an independent gas turbine being preferrable a compressor-burner-turbine which, in effect, divides the air output from the multistage compressor into a stream which is utilized to provide the gas energy for driving the multistage compressor through the multistage turbine and to provide the main thrust by fluid reaction. Also it is divided into a second stream which is utilized to provide both the energy for driving the rotors through the wing turbine which in turn is in driving connection with the rotor, and to contribute to the propulsion thrust. The main thrust provides the necessary thrust for the propulsion of the aircraft.

The invention is further to be understood by reference to the following detailed description read in connection with the accompanying drawings in which is illustrated what is presently considered a preferred embodiment of the invention.

BRIEF DESCRIPTION OF THE DRAWINGS

FIG. 1 illustrates a fragmentary partial section view of the independent turbine engine, the throttling mechanism between the high and low pressure compressor regulating the air stream through conduit which lead to wing turbine and also the combinated rotor, jet reaction propulsion system for an aircraft or V.T.O.L. equipped with or without thust flaps;

FIG. 10 illustrates in a diagram the working cycle of the wing compressor-turbine;

FIG. 11 illustrates an injection compressor-turbine;

FIG. 12 illustrates a wing turbine connected with a jet engine;

FIG. 13 illustrates a wing turbine connected with a power plant;

FIG. 16 schematically illustrates the multi-stage independent turbine;

FIG. 17 schematically illustrates the multi-stage turbofan independent turbine;

FIG. 18 is a perspective view of a single turbine engine for an VTOL or short take off or landing (STOL);

FIG. 19 is a perspective view of a VTOL or STOL aircraft with two turbine engines supported on Delta shaped wings;

FIG. 20 is a perspective top view of a VTOL or STOL aircraft equipped with a wing turbine at each wing tip and an independent turbine at the tail of the aircraft;

DETAIL DESCRIPTION

The principles underlying the present invention are applicable to all type of aircrafts and helicopters with main advantages to conserve energy by increasing the efficiency of operation of supersonic and subsonic aircrafts as well as helicopters, by increasing the lift force and thrust.

Figure 3:
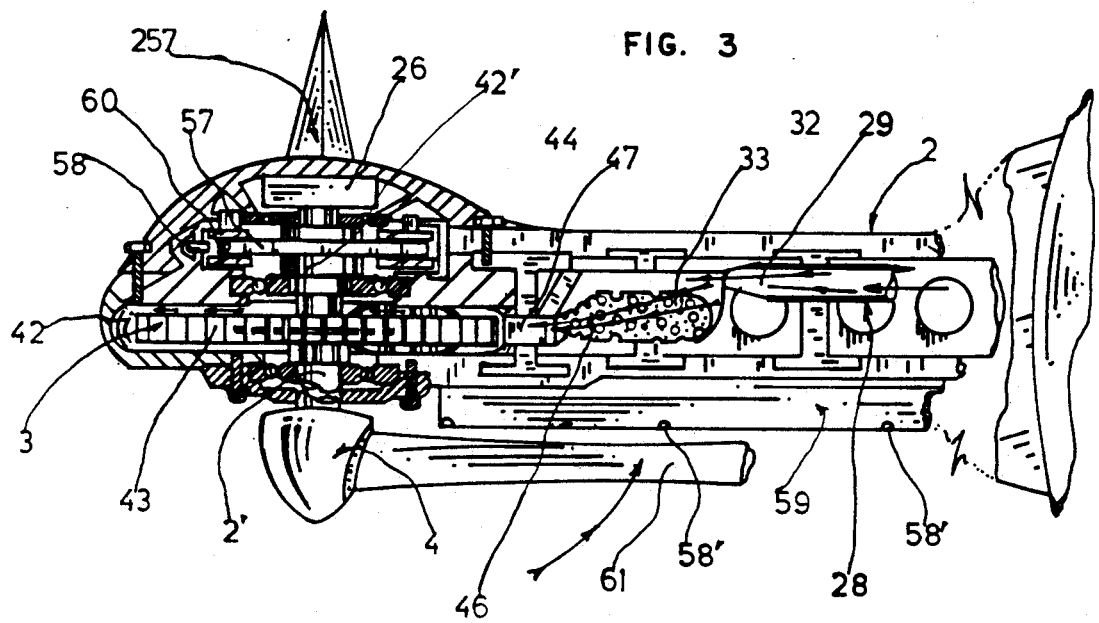
FIG. 3 illustrates in section view the wing turbine supported in the wing frame equipped with turbine brake and radial burner and thrust flaps.
Figure 2:
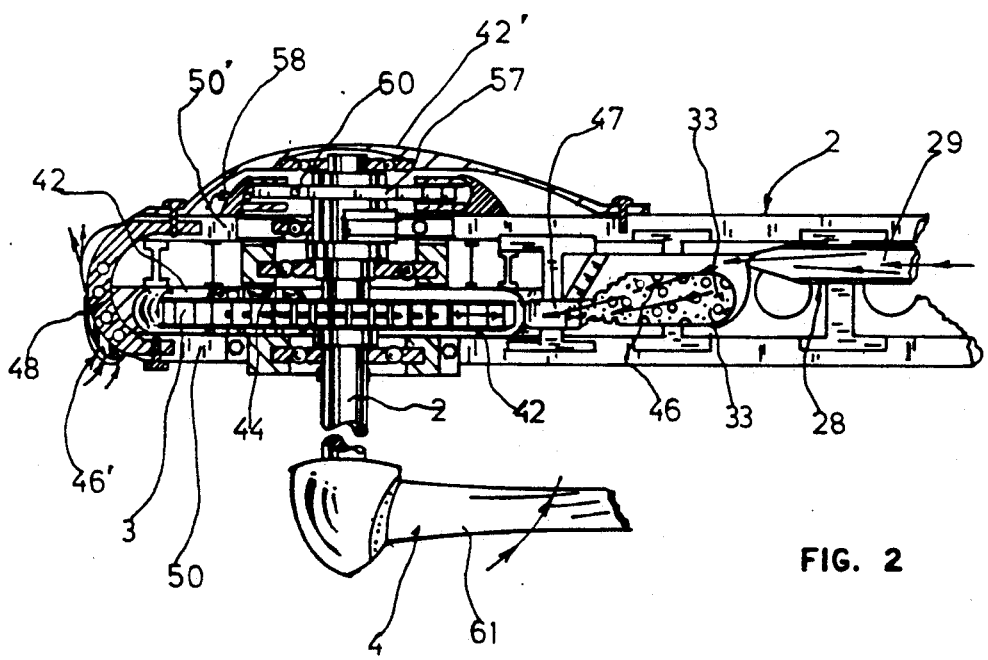
FIG. 2 illustrates in section view the wing turbine supported on the wing tip, equipped with turbine-brake and radial burner.

FIGS. 1, 2, 3 a rotor 1, 4 is attached at each wing tip. The rotor is of a variable pitch and is designed, when rotating, to make the aircraft hover or to increase the air-flow towards the wing 2. The left rotor 1 is rotating clock-wise towards the wing while the right rotor 4 is rotating counter-clock-wise towards the wing. Thus the general torque from the rotors is in balance. The rotors 1, 4 are caused to rotate via shafts 2' which are connected directly to the wing turbine 3.

In place of an axial flow multi-stage compressor 9, 9' a centrifugal-axial flow compressor could be used with equal advantage. A multistage turbine 11 located within the nacelle 10 is located behind the burners 12 and compressor 9, 9' and drives the compressor through the medium of shafts 14, 15. Air is taken into the system and compressed in a first multistage compressor 9' and delivered to a second muiti-stage compressor 9 and to a throttling mechanism 17. After the compressor 9' the air output is divided into streams. The first stream passes through the second multi-stage compressor 9, the annular combustion chamber 16 provided within the nacelle 10 and equipped with fuel-burning means 12, arranged as may be found to be most advantageous to efficiency. Further it passes through the combustion chamber 16, where where the combustion gases pass directly into the multi stage-turbine 19, 20 and discharges therefrom directly into the third stage turbine 21 driving the independent turbine 27 located in a divergent nozzle, to further accelerate the exhaust gases through the propulsion nozzle 22. The third stage turbine 21 is not driven or connected through medium of shaft to the multistage compressor 9', 9 or turbine 19, 20. A second annular combustion chamber 23 equipped with fuel-burning means 24 located between the low pressure turbine and the third stage turbine 21, FIG. 1. The second stream resulting from the divided air output of compressor 9' through conduits 29 which lead to rotor-driving turbine 3, located in the wing tip 5 of each wing 2. Wing-turbine 3, as shown, is preferably of the single-stage type and its mechanical output drives the rotor 1 or 4 with which the turbine 3 is in driving connection by shafting 2' and linked with a change of pitch gearing or hydraulic mechanism, the latter being encased within a housing 26. The wing turbine 3 horizontally supported in the wing for rotating parallel with respect to the rotors 1, 4 and the horizontal axis of the wing. The conduit 29 is provided with a pressure manifold 31 and a radial combustion chamber 33, the manifold 31 being located between the conduit 29 and the burners 32. The conduits 29 passes through the bores of the stiffening transversal beams 37 and being supported on the longitudinal beams 36 and rib assemblies of the wing 2.

Here it may be mentioned that any of the well known starting devices and/or well known manners for starting jet egines may be employed, and such forming no part of the present invention, have not been herein illustrated.

The rotor 1, 4 is of the double or multi-blade type having therein incorporated a (automatically operable) pitch-changing blade mechanism 26 attached to the end of the rotor which at a certain angle will provide an optimum propulsion efficiency under the thrust-flap characteristics and all conditions of load. It is also understood, that a reduction gearing unit may be incorporated suitable for regulating the speed of the rotors 1, 4.

The second stream 41 resulting from the divided output of compressor 9' pass from a throttling device regulating the amount of air supply to the wing turbine 3. Any conventional throttling mechanism which includes, for example hinge flaps supported on the nacelle 10 and/or in the region of the conduit 29 duct system and adapted to be raised and lowered by suitable control means to vary the flow area between the first and second multi-stage compressors 9', 9. The compressed gases pass directly into the pressure manifold 31 and into the combustion chamber 33 and discharge therefrom directly into the wing turbine 3. The exhaust gases are discharged to the atmosphere through a propulsion nozzle 44 which is a continuation of the housing 42 of the wing turbine 3. The housing of the wing turbine 3 has two openings. The first opening supports the inlet guide vanes 47 directing the combustion gases to the single turbine blades 43 and the second opening provides support for the propulsion nozzle 44. Only part of the turbine blades 43 of the wing turbine 3 which are opposite to the inlet guide vanes 47 are receiving a flow of combustion gases 46 per revolution of the wing turbine. An air cooling manifold 48 having a cooling air inlet duct 46' is supported around the housing 50, 50' of the wing turbine 3. The wing turbine 3 is in driving connection with shafting to the rotor 1, 4. The shafting 42' is in connection with a turbine brake 57. When jet thrust is more efficient than the combination of rotor and thrust-flap, the throttling device 17 is closed and the total amount of air is furnished to the second stage compressor, the multi-stage turbines and independent turbine. Thus no power is furnished to the wing-turbine 3 and no fuel is supplied to the burners. To prevent free rotation of the rotors the turbine brake 57 is applied to hold the rotors 1, 4 fix under the wing 2. During subsonic or supersonic flight to avoid shearing and dynamic forces to the rotors and to the wings 2, the rotors 1, 4 are to be held fixed parallel under the wing by means of the turbine brake 57 and the electronic rotor censor 58. The censors 58 control the hydraulic pressure applied by the turbine brake 57. When the rotors 1, 4 are under the desired position under the wing 2 or the thrust-flaps 59 the appropriate desinged pressure is applied by the turbine brake mechanism 57 to prevent any further rotation or movement of the rotor 1 or 4. The design of the turbine brake mechanism 57 could be that of the disk brake. The rotor sensor can be placed under the wing or on the thrust flaps or next to the brake 57. A notch 60 on the turbine brake 57 aligned with one of the two blades 61 of the rotor 1, 4. When the brake 57 rotates a proximity switch detects the position of the rotors 1, 4 through notch 60 and accordingly if appropriate the brake mechanism is activated. If a rotor with more than two blades is used, other methods can be employed for the appropriate flight conditions. In case four blades are used two blades can be held vertically and two parallelly in respect to the horizontal axis of the wing 2 or all four blades could be held diagonally to the horizontal axis of the wing 2. FIG. 20 also shows a rotor equipped with four blades 69 when the blades are held vertically and parallelly in respect to the horizontal axis 70' of the wing 71, and the same rotor equipped with the same number of blades 69 when the blades are held diagonally to the wing 71'. Brake mechanism and censor devices as shown in FIG. 3, 2 and as indicated 57, 58 are not new in the art. Since the details of the adjusting control of the ectronic and mechanical mechanisms are well known and form no part of the present invention, they have not been herein particularized except to the extent shown in the FIGS. 2, 3 and as therein after referred to.

The shafting 42' is in co-axial connection with the turbine brake 57, the wing turbine 3 and the rotors 3. The turbine brake can be located below or above the wing turbine 3. Considering the above described wing-turbine and propulsion system assembly embodiment, here it may be mentioned that may be connected to gas turbine or ram jet engine or with an independent turbine with or without a turbine braking system assembly connected to a wing turbine, therefor they are part of the present invention.

A number of combinations are described hereinafter:

1. Independent turbine FIG. 1.

A. The independent turbine includes a. A two stage compressor which consists of a first stage compressor 9' attached to the shaft 15 driven by the low pressure turbine 20 and a second stage high-pressure compressor 9 attached to the shaft 14 driven by high-pressure turbine 19. The first stage compressor supplies air to the wing turbine through a throttling device positioned between the low and high pressure compressor and the wing duct system. The wing turbine drives the rotors 1, 4. The main air stream is directed from the low to the high pressure compressor;

b. the low pressure compressor 9' is driven by the low pressure turbine 20 and the high pressure compressor is driven from the high pressure turbine 19 of the multi-stage turbine 11;

c. a combustion chamber 16 intermediate the multi-stage compressors 9', 9 and multi-stage turbine 11. A second combustion chamber 23 intermediate the low pressure turbine 20 and the third stage turbine 21;

d. the exhaust gases from the low pressure turbine entering the second burner 23 and through the inlet guide vanes 18 driving the third stage turbine 21. The third stage turbine 21 is co-axially connected with the independent turbine 27. The third stage turbine 21 connected to and driving the independent turbine 27; the independent turbine 27 accelerates the exhaust gases further at high speeds through a propulsion nozzle 22. The independent turbine is located in a divergent nozzle 30. The propulsion nozzle 22 is preferably the convergent type with a cylindrical exhaust guide 35; and e. a third radial combustion chamber 33 intermediate a pressure manifold and inlet guide vanes 47. The wing turbine 3 is not equipped with turbine brake 57 as described above. The rotor 1, 4 revolutions and/or position is regulated by the wing turbine 3 only.

B. Bypass independent turbine includes a. A two stage compressor which consists of a first stage low pressure compressor 9' attached to the shaft 15 driven by the low pressure turbine 20 and a second stage high pressure compressor 9 attached to the shaft 14 driven by high pressure turbine. The first stage compressor supplies air to the wing turbine 3, through a bypass duct without a throttling device 17. The bypass duct positioned between the low and high pressure compressors 9', 9 and wing duct system 28. The wing turbine drives the rotors 1, 4. The main air stream is directed from the low to high pressure compressor;

b. as described in section 1,A,b.; c. as described in section 1,A,c.; d. as described in section 1,A,d.; as described in section 1,A,e and/or;

e. a third radial combustion chamber 33 intermediate a pressure manifold and inlet guide vanes 47. The wing turbine 3 is not equipped with a turbine brake 57.

FIG. 13

2. A wing turbine connected with a power plant, FIG. 13

A. The wing turbine connected with a turbo-fan a. A two stage compressor which consists of a first stage compressor 80 attached to the shaft 81 driven by the low pressure turbine 82 and a second stage high-pressure compressor 83 attached to the shaft 84 driven by the high pressure turbine 85. The first stage compressor 80 supplies air to the wing turbine, through a throttling device positioned between the low and high pressure compressors 80, 83 and the wing duct system 28'. The wing turbines 3 drive the rotors 1, 4. When the throttling device 87 is open three streams result from the divided air output: a) the primary bypass air stream 86, b) the main second stream through conduit 89, which leads to high pressure compressor and turbines 83, 85 and low pressure turbine 82 and c) the divisional third stream leading to wing turbine 3;

b. a combustion chamber 91 intermediate the multi-stage compressor 83 and multi-stage turbine 85, 82; and c. a second radial combustion chamber 33 with an intermediate pressure manifold 31 and inlet guide vanes 47. The wing turbine 3 is equipped with turbine brake 57 as shown in FIGS. 2, 3. The rotors 1, 4 revolving speed and position regulated by the turbine brake 57.

Figure 4:
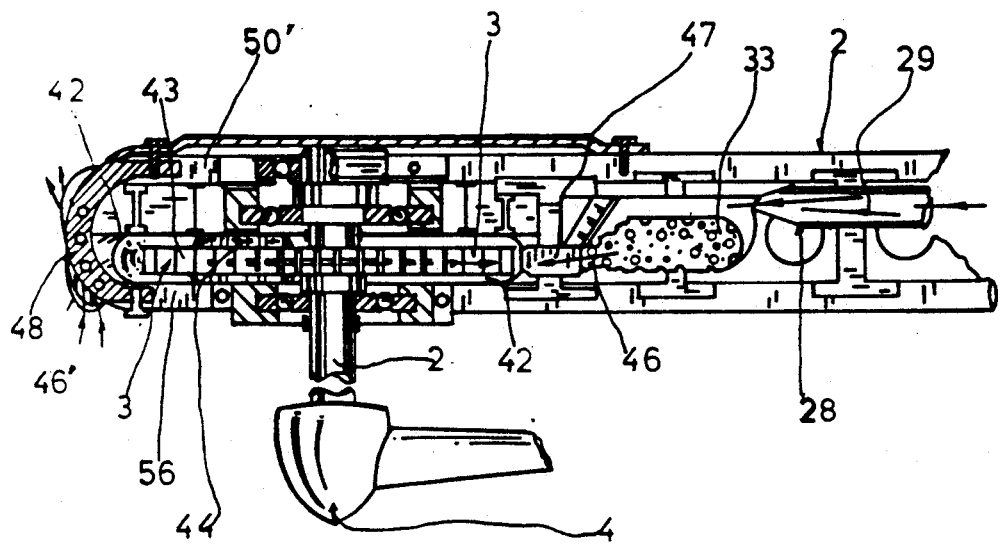
FIG. 4 illustrates in section view the wing turbine supported on the wing tip without turbine-brake.

B. The wing turbine connected with a turbo-fan with no throttling mechanism and brake a. The wing turbine 3 is connected to turbo-fan power plant as described in section 2,A,a but is not equipped with throttling mechanism and a turbine brake; b. as described in section 2,A,b; and c. a second radial combustion chamber 33 with an intermediate pressure manifold 31 and inlet guide vanes 47. The win turbine 3 is not equipped with turbine brake 57 and a throttling mechanism 87, as shown in FIG. 4.

Figure 8:
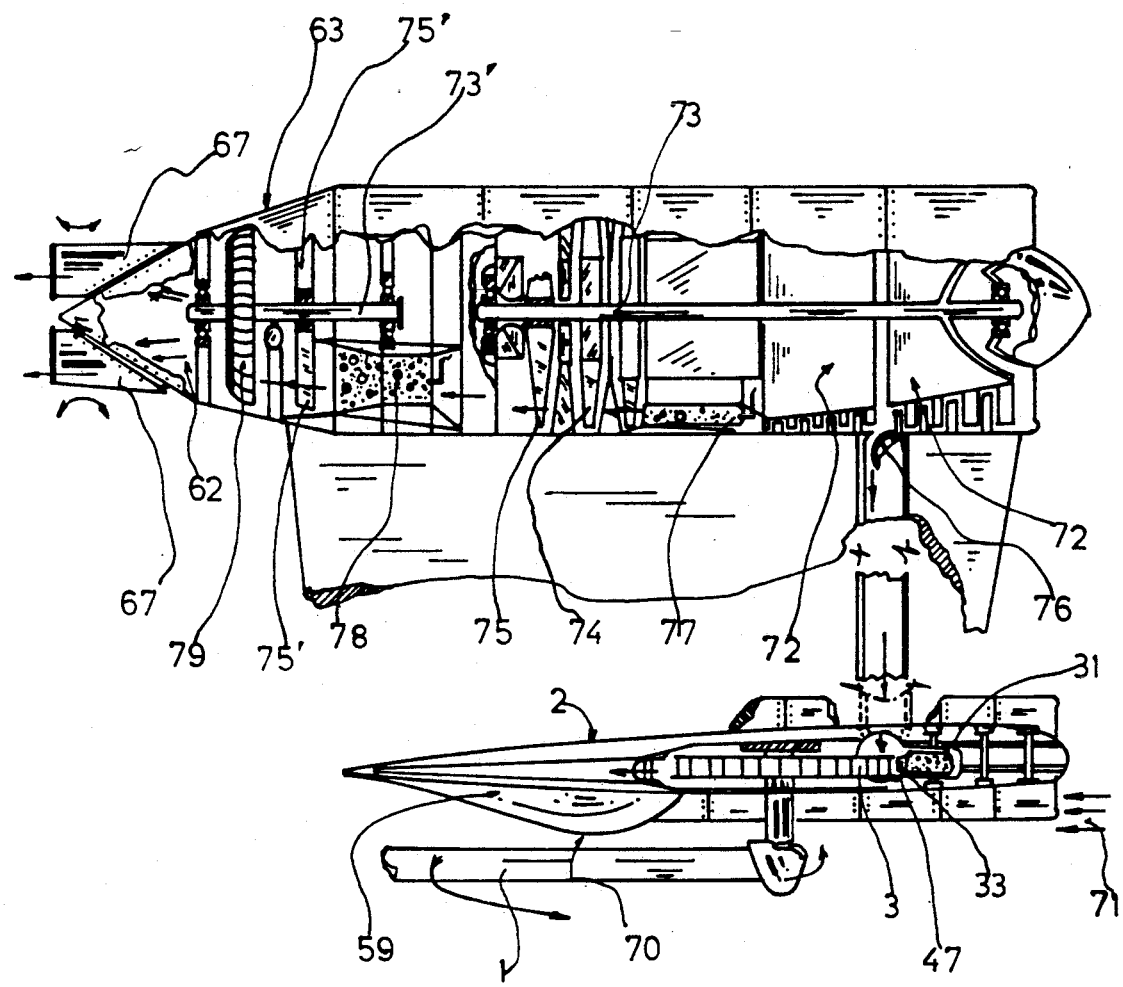
FIG. 8 illustrates the turbine system assembly.

3. Turbine system assembly drivind a wing turbine FIG. 8

A. Turbine system assembly driving a wing turbine equipped with a throttling mechanism and a turbine brake, includes a. a two stage compressor which consists of a first stage compressor 70 having blades located at the wing's tip rotors 1, 4 for generating thrust at the thrust units 59 and the wing 2, and for forcing part of the air stream 71 to enter into inlet nozzle, and a second high-pressure-compressor 72 attached to the shaft 73 driven by means of the reaction gases from the high pressure and low pressure turbines 74, 75;

b. the amount of air supplied to the wing turbine 3 is controled by a throttling mechanism 76 situated between the initial stage of the multi-stage high pressure compressor;

c. three burners including a first burner 77 located between the high pressure multi-stage compressor 72 and the high pressure turbine 74, a second burner 78 located between the third stage turbine 79 and the low pressure turbine 75, and a third radial burner located between a pressure manifold 31 and inlet vanes 47; and d. a three-stage turbine which includes a first high pressure turbine 74 for driving the high pressure compressor 72 and rotors 1, 4 of the first stage compressor 70; a second stage low-pressure turbine 75' is in connection with shafting 73' for driving a third stage turbine 79 located in the divergent nozzle 63 to further accelerate the exhaust gases into the holder 62 and the pivotable nozzle 67. The combustion gases from the high pressure multi-stage turbine 74 and the burner 78 are discharged at the second stage low pressure turbine 75' through guiding vanes 65; and e. the wing turbine 3 is equipped with turbine brake 57 as shown in FIGS. 2, 3. The rotors 1, 4 revolution and/or position are regulated by the wing turbine brake 57 and wing turbine 3.

B. Bypass turbine system assembly driving a wing turbine, includes a. as described in section 3,A,a;

b. the amount of air supplied to the wing turbine 3 succeeded by a bypass duct system;

c. as described in section 3,A,c;

d. as described in section 3,A,d; and e. a wing turbine 3 not equipped with turbine brake 57 as shown in FIG. 4. The rotors 1, 4 revolution and/or position is regulated by the wing turbine 3 only.

FIG. 12

4. A wing turbine connected with a jet engine as shown in FIG. 12

A. A jet engine is connected with a wing turbine equipped with a throttling mechanism and turbine brake includes a. a two stage compressor which consists of a first stage compressor 92 attached to the shaft 96 driven by the low pressure turbine 93 and a second stage high pressure compressor 94 attached to the shaft 96' driven by the multi-stage high pressure turbine 97;

b. a combustion chamber 95 intermediate the multi-stage compressor 94 and multi-stage turbine 97; and c. the low pressure turbine 93 supplies air to the wing turbine 3 through a throttling device 100 located between the stator vanes 98 and the exhaust nozzle 99 the throttling device 100 as shown in FIG. 12. When the throttling device 100 is open two streams result from the divided exhaust gas output. The first stream of combustion gases discharges through the nozzle 99 and the second stream discharges through the duct 101 to the wing turbine 3. When the throttling mechanism 100 is closed and in position 100', one stream of exhaust gas results through the nozzle 99 and the turbine brake 57 is applied holding the rotors fixed at the designed position, thus the aircraft can achieve higher speed. The jet turbine 103 is mounted directly above the wing turbine 3 to avoid pressure losses due to the friction of the exhaust gases with extented duct walls.

B. The wing turbine connected with a jet engine equipped with a bypass mechanism after the stator vane, includes a. as described in section 4.A,a;

b. as described in section 4,A,b;

c. the low pressure turbine 93 supplies air to the wing turbine 3, through a bypass mechanism located between the stator vanes 98 and the exhaust nozzle 99 and a bypass duct nozzle 101. The wing turbine in both combinations 4 A,B is driving the rotor 1 or 4. The wing turbine 3 is not equipped with a turbine brake 57.

FIGS. 6 & 7

Figure 6:
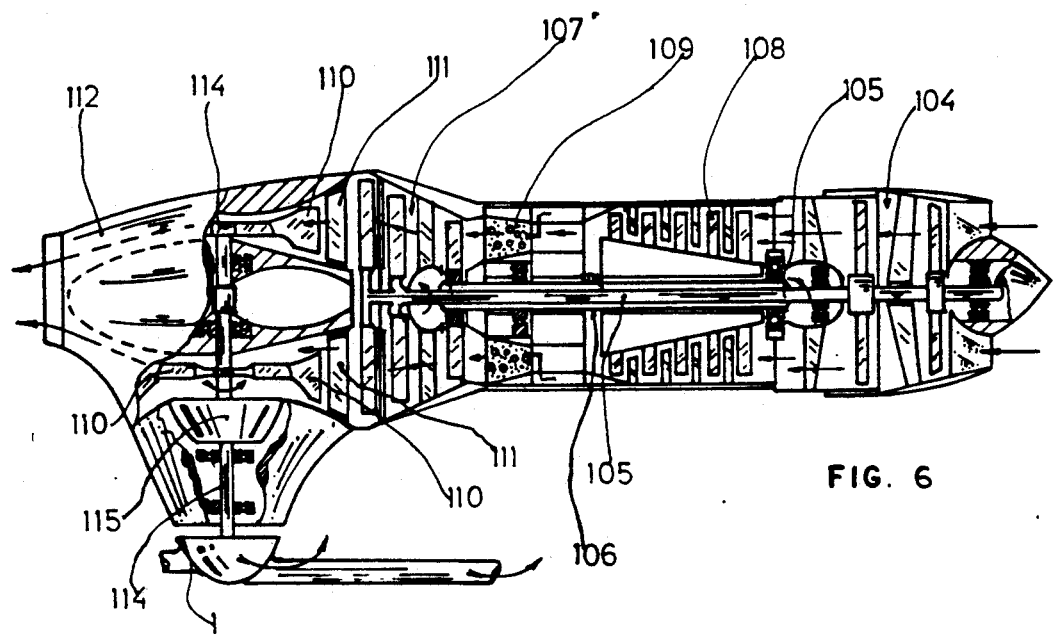
FIG. 6 illustrates in fragmentary partial section view an horizontal independent turbine engine.

5. An horizontal independent turbine. FIG. 6.

A. An horizontal independent turbine with a single exhaust nozzle:

a. a two stage compressor which consists of a first stage compressor 104 attached to the shaft 105 driven by the multi-stage turbine 107 and a second multi-stage compressor 108 attached to the shaft 106 driven by the multi-stage high pressure turbine 107';

b. a combustion chamber 109 intermediates the multi-stage compressor 108 and multi-stage turbine 107'; and c. the multi-stage turbine 107 supplies exhaust gases to the horizontal turbine 110 through the horizontal vanes 111. The exhaust gases are driving the horizontal turbine 110. The exhaust gases are discharged through an exhaust nozzle 112. The horizontal independent turbine is in driving connection by shafting 114 to the rotor 1 or 4. The horizontal independent turbine is preferrable to the single-stage type and its mechanical output drives the rotors 1 or 4. The shafting 114 can be linked with a change of pitch gearing or hydraulic mechanism, the later being encased within a housing 115. The exhaust gases discharged from the burner 109 are driving the multi-stage high pressure turbine 107' and the horinzontal independent turbine 110.

B. An horizontal independent turbine with bypass nozzle, FIGS. 7, 6 a. as described in section 5,A,a;

b. as described in section 5,A,b; and c. the multi-stage turbine 107 supplies exhaust gases to the horizontal turbine 110 through the horizontal vanes 111 dividing the exhaust gases into two streams; The first stream passes through the horizontal turbine 110 and through the exhaust nozzle 112' and the second stream, resulting from the divided exhaust gases output of the multi-stage turbine 107 due to the horizontal vanes 111, is directed to discharge through the thrust nozzle 117. The horizontal vanes are located between the muti-stage high pressure turbine 107' and the horizontal turbine 110.

Figure 7:
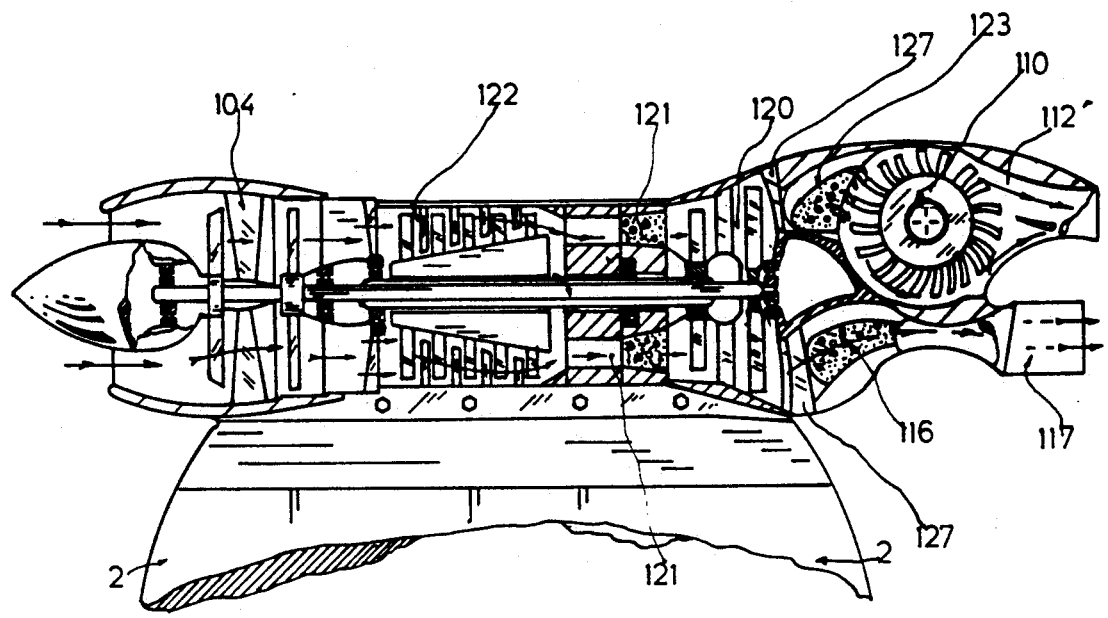
FIG. 7 illustrates in fragmentary partial section and side view an horizontal independent turbine supported at the wing tip.

C. An horizontal independent turbine equipped with a bypass burner thrust nozzle As shown in FIG. 7;

a. as described in section 5,A,a;

b. a combustion chamber 121 intermediate the multi-stage compressor 122 and multi-stage turbine 120. A second burner 116 is located between the outlet guide vanes 127 and the thrust nozzle 117. The gases discharged through the nozzle 117 generate a jet reaction thrust; and c. the multi-stage turbine 120 discharges exhaust gases to the outlet guide vanes 127; the outlet guide vanes 127 divide the exhaust gases into two streams, the first stream passes through the horizontal turbine 110 and through the exhaust nozzle 112'; and the second stream, resulting from the divided exhaust gases output of the multi-stage turbine 120, passes through the horizontal vanes 127 and the second burner chamber 116 to discharge into the thrust nozzle 117. The outlet guide vanes 127 are located between the turbine 120 and the second burner 116.

D. An horizontal independent turbine equipped with a bypass nozzle and two auxiliary burners As shown in FIG. 7;

a. as described in section 5,A,a;

b. a combustion chamber 121 intermediates the muti-stage compressor 122 and multi-stage turbine 120. A second burner 116 is located between the outlet guide vanes 127 and the thrust nozzle 117 The burner is of the single type and also co-axial to the throat of the thrust nozzle 117; and a third burner intermediated between the horizontal independent turbine 110 and the outlet guide vanes 127.

c. the multi-stage turbine 120 discharges exhaust gases to the outlet guide vanes 127. The vanes 127 divide the exhaust gases into two streams. The first stream passes through the third burner 123 and the horizontal turbine 110 and the second stream, resulting from the divided exhaust gases output of the multi-stage turbine 120, due to the horizontal vanes 127, passes through the second burner 116 to discharge into the thrust nozzle 117.

FIG. 5

Figure 5:
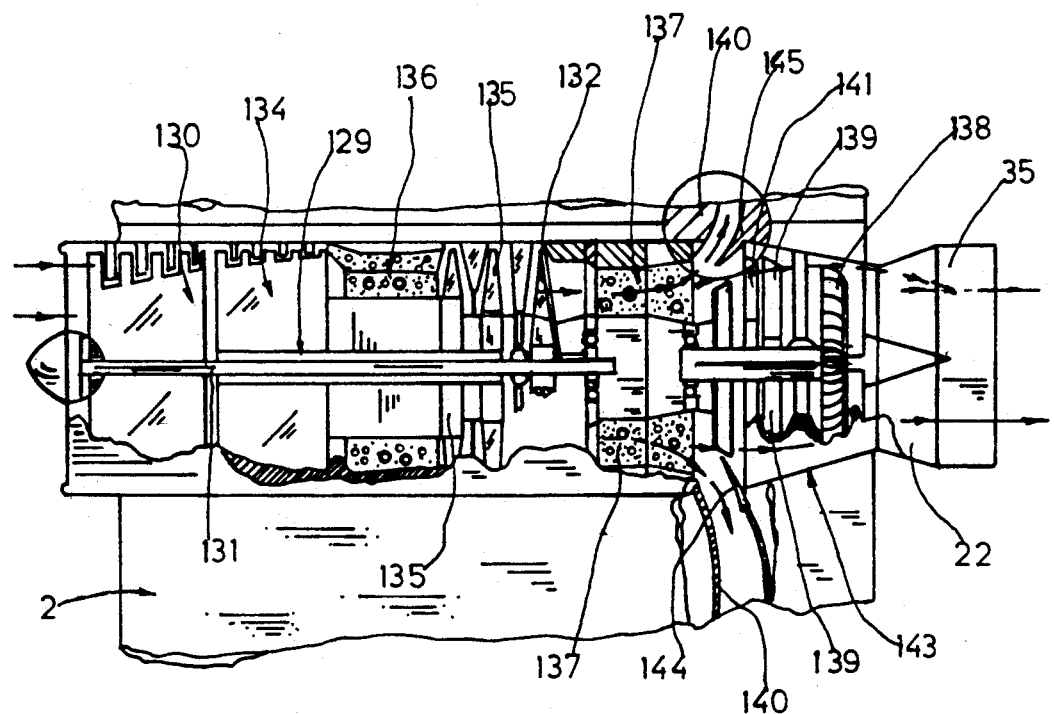
FIG. 5 illustrates a fragmentary partial section view of the independent turbine engine having a throttling mechanism between the second combustion chamber and the independent turbine.

6. An independent turbine engine having a throttling mechanism between the second burner and the third stage turbine As is shown in FIG. 5.

a. A two stage compressor which consists of a first stage compressor 130 attached to the shaft 131 driven by the low pressure turbine 132 and a second stage high-pressure compressor 134 attached to the shaft 129 driven by the high-pressure turbine 135. The first stage compressor supplies air to the second multi-stage compressor 134. The first stage compressor can be of the bypass type also;

b. the low pressure compressor 130 is driven by the low pressure turbine 132 and the high pressure compressor is driven by the high pressure turbine 135;

c. a combustion chamber 136 intermediates the multi-stage compressor 134 and multistage turbine 135. A second combustion chamber 137 intermediates the low pressure turbine 132 and the third stage turbine 139;

d. the exhaust gases from the low pressure turbine enter the second burner 137 and drive the third stage turbine 139 through the inlet guide vanes 141. The third stage turbine 139 is co-axially connected with the independent turbine 138. The independent turbine 138 is connected to and driven by the third stage turbine. The independent turbine is located in a divergent-convergent nozzle 143; and e. the low pressure turbine discharges the gases into the second burner chamber 137 with the exhaust gases divided into two streams. The first stream is taken into the system and compressed in the first stage compressor 130 and futher compressed into the second multi-stage compressor 134. It then passes through the combustion chamber 136 into the multi-stage turbines 135, 132 and finally through the third stage turbine 139 and independent turbine 138. The second stream resulting from the combustion gases output which devided after the second burner 137 and discharge pass a throttling device, located prior the third stage turbine regulating the amount of exhaust gases supplied to the wing turbine 3. The throttling mechanism 144 intermediates the second chamber 137 and the third stage turbine 139. The second stream discharges therefrom through the duct system 140 and the outlet guide vanes to the wing turbine 3. The wing turbine is equipped with turbine brake 57 as described and shown in FIGS. 2, 3. The rotors 1, 4 revolutions and/or position are regulated by the wing turbine 3, the turbine brake 57 and the sensors.

B. An independent turbine having a bypass mechanism between the second combustion chumber and the third stage turbine, includes a. a two stage compressor which consists of a first stage low pressure compressor connected to a shaft driven by a low pressure turbine and a second stage high pressure compressor attached to a second shaft driven by a high pressure turbine;

b. multi-stage combustion chambers: the first combustion chamber 136 intermediates the multi-stage compressor and multi-stage turbine, and the second combustion chamber 137 intermediates the low pressure turbine and the third stage turbine 139 c. as described in section 6,A,d; and d. the combustion gases from the low pressure turbine and the second combustion chamber 137 discharge to a bypass mechanism 145. The bypass mechanism 145 is intermediate between the second combustion chamber 137 and the third stage turbine 139. Two streams result from the bypass mechanism 145; the second bypass stream, resulting from the divided output of the bypass mechanism 145, discharges therefrom through the duct system 140 and the outlet guide vanes to drive the wing turbine 3. The first stream resulting from the divided output of the low pressure turbine 132 and combustion chamber 137, discharges to drive the third stage turbine 139.

FIG. 9

7. A wing compressor-turbine

A. A wing compressor-turbine can have the same combination assemblies with turbine engines as the wing turbine herein described in sections 1,2,3,4,5 & 6.

Figure 9:
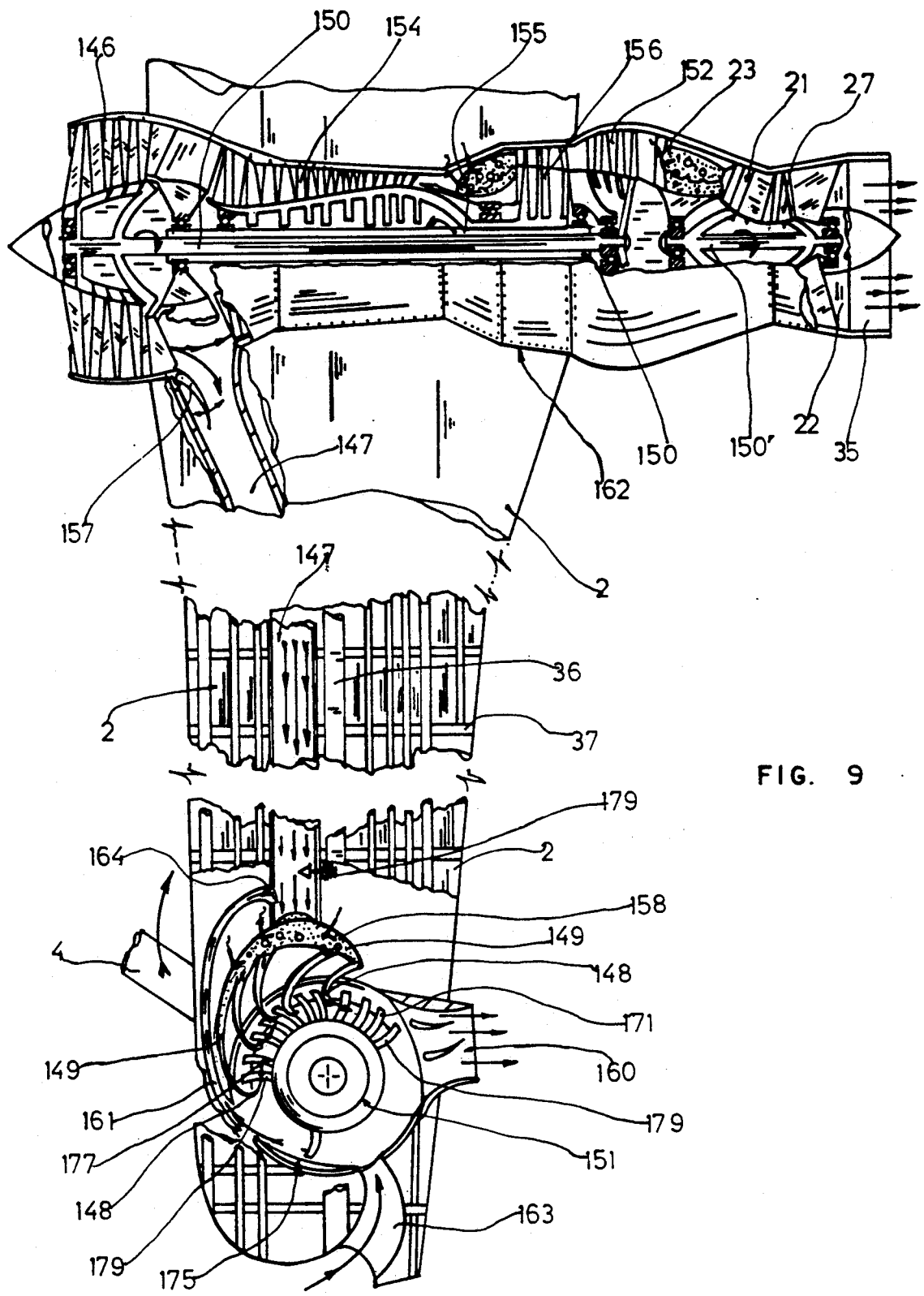
FIG. 9 illustrates a fragmentary partial top view of a wing compressor-turbine receiving compressed air.

B. For example a. a two stage compressor which consists of a first stage compressor 146 attached to the shaft 150 driven by low pressure turbine 152 and a second stage high-pressure compressor 154 attached to the shaft 155 driven by the high-pressure turbine 156. The first stage compressor supplies air to the wing compressor-turbine 151 through a throttling mechanism 157 intermediate to the low and high pressure compressors 146, 154. The wing compressor-turbine 151 drives the rotors 1, 4;

b. as described in section 1,A,b;

c. as described in section 1,A,c;

d. as described in section 1,A,d;

e. the second stream resulting from the divided output of the compressor 146 enters a duct system 147 connected to a combustion manifold 149. The combustion manifold 149 is equipped with injection nozzles 148 discharging combustion gases to the compressor-turbine 151. The injection nozzles 148 are fuel burning means attached to burner 158 suitable to be fitted by the wing turbine and functioning on the same principal as the single burner 33. The burner could positioned tangentially to the compressor-turbine blades or in any other suitable manner such as by the injection nozzle to provide the maximum efficiency of the reacting combustion gases on the blades 179. The combustion gases drive the compressor-turbine 151 and discharge through a thrust nozzle 160. The compressor-turbine is equipped with turbine brake 57 as described above. The wing copressor-turbine 151 as shown in FIGS. 9, 11 and preferrably as a single-stage type, where and its mechanical output drives the rotor 1 or 4 with which the compressor-turbine 151 is in driving connection by shafting 167 and linked with a change of pitch gearing or hydraulic mechanism. The latter being encased within a housing intermediate to the turbine brake 57 and the compressor-turbine 151 or the housing can be placed between the compressor-turbine 151 and the rotor. It is also understood that a reduction gearing unit may be incoporated suitable for regulating the speed of the rotors 1, 4. Any conventional throttling mechanism which includes, for example hinge flaps supported on the nacelle 162 and/or in the region of the duct system 147 and adapted to be raised and lowered by suitable control means to vary the amount of gases deviated; and f. All types of wing turbines of the sections 1–6 can be equipped with air-cooling manifolds 48 shown in FIG. 9. In the case of the compressor-turbine air cooling manifolds are not necessary since an intake duct 163 is used. A duct intake 163 is incorporated on the wing tip and has its intake orifice located on the edge of the wing tip so that turbulent air flow at the wing tip is delivered by the duct to the compressor-turbine 151 for cooling and to provide air for combustion. Therefore a substantial supply of cooling air for the compressor-turbine 151 is secured at all times. FIGS. 10, 11 the compressor-turbine 151 is rotating based on the following working cycle. Air is supplied from duct system 147 to combustion manifold 149 and discharged through the injection nozzles 148 to rotate the compressor-turbine 151. The exhaust gases discharge through the nozzle 160 to the atmosphere. The upper part of the blades 171 forming the compressor, create a suction as they rotate past part 175 of the housing 180. Air is supplied through duct intake 163 to the blade part 171. The air is trapped in the blades 177 compressed at housing point 175 and is forced to discharge into a conduit 161 which is connected with the combustion manifold 149. The combustion gases discharge through the injection nozzles to the turbine part 179 of the blades 177 to drive the compressor-turbine 151. The mechanical work of the compressor-turbine 151 drives the rotor 1 or 4. A one-way pressure valve 164 located in the duct 161 prevents any gases to enter the duct 161 from the combustion manifold 149. An electromagnetic valve can control the necessary amount of air supplied to the combustion manifold 149 if the air supply provided by the duct 161 is not sufficient. The electromagnetic valve 176 is located in the duct 147.

FIGS. 16, 24

8. A multi-stage independent turbine FIG. 16 drive the rotors by means of a reduction gear box, a change of pitch mechanism and a clutch-brake system FIG. 16 illustrates one type of the V.T.O.L. or S.T.O.L. aircraft having take off or landing capabilities.

a. The wings 2 has an aerodynamic composite airfoil. Each wing 2 supports a thrust flap 7 located at the lower camber curvature and/or trailing edge. The thrust flap 7 located at the lower camber curvature and/or trailing edge. The thrust flaps selectively change the aerodynamic effects by altering the aerodynamic geometry of the lower camber towards the trailing edge of the wing to form an open convergent-divergent nozzle shaped aerofoils 5, 8 which are curved based on the thrust-flaps characteristics. The rotation of the rotors 1, 4 cause the airflow to generate lift and thrust simultaneously as the rotor force the air to pass over and under the wing, further compresses the air flow at the throat of the convergent nozzle and discharges between the divergent nozzle 8 and the blade 24 of the rotors 1, 4.

The blades 24 of the rotors 1, 4 are provided with variable pitch blades to increase the amount of air supplied to the thrust flap 7. The geometry of aifoils 5, 8 and the pitch of the blades are varied by the controlling mechanisms, thus providing the best thrust result at the convergent nozzle aerofoil 8.

The multi-stage turbine 181, a divided plant as shown in FIG. 16, is a propulsion system for any type of aircraft but more suitable to a V.T.O.L. plant. The first power plant 182 includes a bypass air compressor located at the wing tip by means of the rotors 1, 4, a second multi-stage compressor 184, a multi- stage gas turbine 185 connected to and driving both stages of air compressors, a combustion chamber 186 intermediate to the high pressure multi-stage second compressor 184 and a multi-stage turbine 185. Also a second power plant system located in the same nacelle having a multi-stage low pressure turbine 187 connected to and driving an independent turbine in the throat 188 of the convergent nozzle a second combustion chamber intermediate to the low pressure turbine 187 and the high pressure turbine 185, The connected shaft between the low pressure turbine 187 and the independent turbine 189 is not connected to the first power plant 182. The high pressure turbine 185 as shown in FIG. 16 is preferably of the multi-stage type and its mechanical output drives the high pressure compressor 184 by means of a shaft 190. The shaft 190 extends to be in driving connection with the reduction gear and clutch-brake mechanism box 191 system. The bevel gear box 192 arrangement is driven by the high pressure turbine shafting 193, 190. When the clutch is applied the shaft 190 is disengaged from the shaft 193. The brake is connected with the shaft 193 and prevents any further rotation of the shaft 193 when the clutch disengages the shaft 193. The rotors 1, 4 are not rotating since the bevel gears couplings 192 are in driving connection with the shaft 193. The bevel gear couplings 192 are in driving connection with the high pressure turbine shafting 190. Preferably part of the stages of the high pressure turbine will drive the coupling 192 and most of the stages of the high pressure turbine will drive the high pressure compressor 184. The first coupling of the bevel gears 201, 202 is connected to the second coupling of the bevel gears 203, 204, 205 by means of a shaft 206. The clutch brake mechanism 191 intermediates the shafting 193 to the first coupling of the bevel gears 201, 202. As the clutch is activated the brake is automatically applied and stops the shaft 193 from rotating. The brake pressure is regulated to stop the rotors to a desired position by means of censors as described in the case of the wing turbine. The third coupling of the bevel gears 207 is located at the wing tip of the wing 2. The third coupling 207 is in driving connection with the second coupling through the shafts 208, 209. The third coupling 207 is linked with the change of the pitch mechanism located in the housing 196 and in driving connection with the rotor. Joints 210 are intermediate between the wing shafting 209, 208 and the second coupling bevel gears 204, 205 to avoid fracture or shear stress due to vibrations during flight.

FIG. 17

9. Multi-stage turbofan engine

The tail propeller is driven by the independent turbine and in conjunction with the exaust nozzles generating thrust for vertical or horinzontal montion.

FIG. 17 shows the parts of the turbofan engine in schematic section view.

a. At least two compressing fans function as a low pressure compressor 224' wherein part of the compressed air is ejected directly to the exhaust nozzle 220" as cold jet. The first stage compressor 224' driven by the low pressure turbine 212" and a second stage high-pressure compressor 224" attached to shaft 225 driven by high-pressure turbine 216. The low pressure compressor is attached to the shaft 217 driven by the low pressure turbine 212";

b. a combustion chamber 228' intermediate the multi-stage compressors 224" and multi-stage turbine 216. The exhaust gases pass through the high and low pressure turbines, the exhaust vanes, the independent turbine and discharge through the pivotable thrust nozzles. The independent turbine 211 is co-axially connected by means of shafting 222, 223". A reduction gear and clutch mechanism 26' is intermediatly connected between the independent turbine 211 and the fan 212. The clutch is activated for V.T.O.L. or S.T.O.L.. The cold exhaust nozzles 220" can be also pivotable.

The multi-stage turbofan engine can drive a wing turbine in a similar way described in section 1,A,a or 1,B,a.

FIGS. 14, 15

Thrust Flaps Characteristics

The type of nozzle required to be formed by the thrust flaps 7 depends upon the discharge pressure. If the discharge pressure is greater than the critical pressure, a convergent nozzle is required, where if it less than the critical pressure a convergent-divergent nozzle is necessary.

For small pressure drops the flow is virtually incompressible and the ideal performance would be in accordance with the Bernouli equation with a minimum pressure at the throat, where the velocity is at maximum and remains unchanged as the pressure drops still further, as long as the flow remains subsonic throughout. Once the pressure at the throat 7' has dropped to its critical value, the nozzle chockes and further reduction in back pressure causes no change in the mass flow. The geometry of the lower chamber of the wing 2 is changed in accordance with the angle inclination of the convergent-divergent nozzle. The importance of the thrust flaps 7 is the ability of the wings to produce lift and/or thrust simultaneously or only lift. The rotors 1, 4 provide a rotating aerofoil under the thrust flaps 7. The rotation of the rotors creates lift and/or thrust in conjunction with the thrust flaps. Air is compressed between the rotor 1 or 4 and the throat 7' of the thrust flap 7. The thrust produced from the wings is directly propotional to the angular velocity of the rotors, the area between the throat point 7', the number of blades and the blade area, as well as the speed of the aircraft. To sustain maximum effect of the air compressed under the thrust flaps the aerofoil is aerodynamically shaped according to the Aerodynamic Thrust Flap Characteristics, T.F.C..

The thrust produced by the thrust flaps and rotors may be calculated by the formula:

If p is the inlet pressure and T the inlet temperature and let $p_1$ be the outlet pressure and $T_1$ the outlet temperature;

R gas constant, ratio of specific heats, $c_p/c_v$ $$C = pA_c\left[\left(\frac{2\gamma^2}{\gamma-1}\right)\left(\frac{2}{\gamma H}\right)^{(\gamma+1)}/(\gamma-1)\left(1-\left(\frac{p_1}{p}\right)^{(\gamma-1)}/\gamma\right)\right]^{\frac{1}{2}}$$

$A_c$ throat area,

The thrust flap formed by means of a half open convergent divergent nozzle extending longidutinally to the wing's span. The rotation of the rotor produces a change of momentum of the fluid at the inlet throat 7'. The airflow is compressed and by fluid reaction creates thrust as it discharges through the aerofoil 8.

The following parameters are used: A=throat area, x=throat gap, a=angle of attack of the wing 2, $\theta$=inlet angle, $\phi$=exit angle, $v_i$=inlet absolute velocity of fluid, $v_{ri}$=inlet relative velocity of fluid, $v_f$=flow velocity, $u_w$=mean velocity, $u_{re}$=outlet velocity, $u_w$=rotor velocity, $v_{fe}$=exit flow velocity, $v_{fi}$=inlet flow velocity. Therefore, the velocity of flow is that velocity which passes the fluid across the thrust flaps; if there is no change of velocity, $v_{fi}=v_{fe}$ then there is no wing thrust. If there is change in velocity then an end wing thrust is present and the direction of the thrust depends on whether $v_{fe}>$ or $<v_{fi}$. The end thrust in this case can be calculated by the formula $F_e=\dot{m}(v_{fi}-v_{fe})$ Newtons, where $\dot{m}$=mass flow. The force applied by the rotor can be calculated by $F=m(u_{wi}+u_{we})$ Newtons. The Kinetic Energy of the wind supplied by the rotor to the thrust flaps is K.E.=$\dot{m}v_i2/2$, joules/sec. The throat area between the thrust flaps and the rotors is adjusted so that the pressure outside the thrust flaps exit area is below the design value. When the air expands outside the thrust flaps gives an additional pressure thrust which may be calculated by the formula:

*pressure thrust*=$(p_c-p_i)A_e$ where $p_c$=pressure at the throat, $A_e$=nozzle 8 exit area, m=mass flow & $p_a$=atmospheric pressure The exit area $A_e$ is denoted between the extreme end of the aerofoil 8 and the rotor 1 or 4.

The thrust flaps angle is adjucted in accordance with the speed of the aircraft, angular velocity of the rotors and the pitch of the rotors 1, 4 regulating the air flow under the wing 2. The effect of the air flow on the thrust flap area depends upon the density and the ambient temperature of the air also. In order to have the maximum efficient by the thrust flaps the appropriate design angle taken. by the thrust flaps may be in accordance with the formula:

a. critical pressure ratio between thrust flaps and rotors when the area of the throat is minimum;

$p_c/p_i=[2/(\gamma+1)](\gamma/\gamma-1)$ and could be maintained at supersonic or subsonic flights;

b. critical velocity of air between thrust flaps and rotors:

$$u = [(RT_c)]^{\frac{1}{2}}$$

$T_c$ = air temperature at the throat; and c. the mass flow rate of air, $m_a$ is given by $$m_a = CA\,[2P_b(p_c - P_b)]^{\frac{1}{2}}/[RT_c(1-k^2)]^{\frac{1}{2}}$$

where $P_b$ = back pressure, C = discharge coefficient for the orifice rate is approx.: 0.61, A = orifice area denoted between the thrust flap throat 7' and the rotor 1 or 4, k = orifice area/exit area $A_e$.

Figure 14:
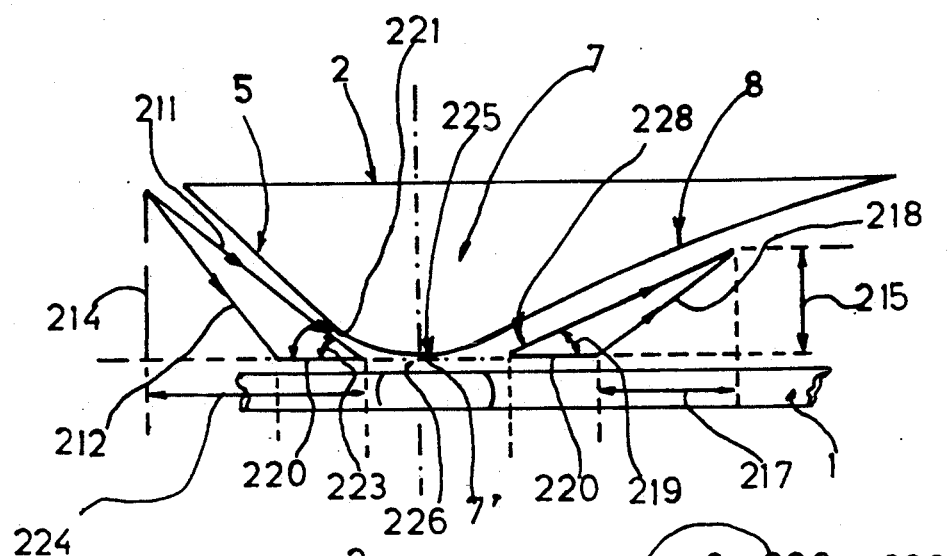
FIG. 14 is a schematic view illustrating part of the thrust-flap characteristics.
Figure 15:
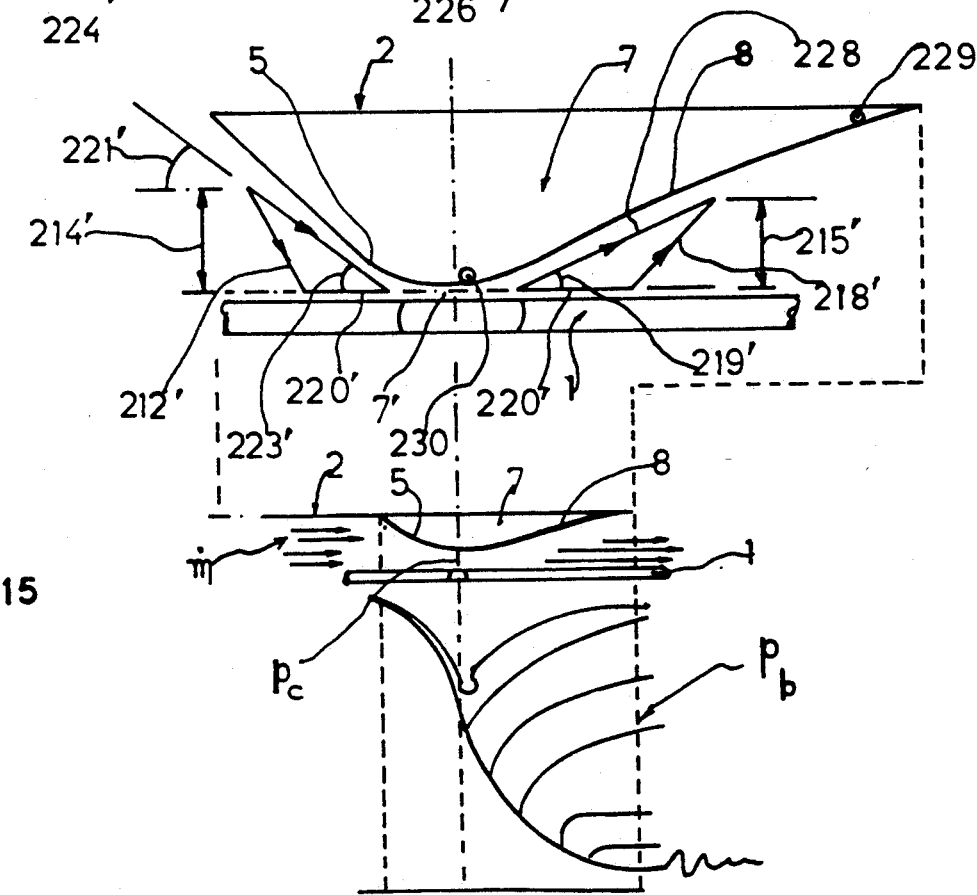
FIG. 15 is a schematic diagram to illustrate back-pressure effect on the thrust flaps.

In accordance with the FIG. 14 the thrust parameters are denoted on the drawn Figure by the following numerals:

A = throat area 225;
x = gap between the rotor and the throat 7', 226;
a = angle of attack of the wing, 223, 223';
$\theta$ = inlet angle of the air flow at the airfoil 5, 221;
$\phi$ = exit angle of the air flow from the airfoil 8, 219, 219';
$v_i$ = inlet absolute velocity of the air flow, 211;
$v_{ri}$ = inlet relative velocity of the fluid, 212, 212';
$u_w$ = mean blade velocity, 220, 220';
$v_{fe}$ = exit flow velocity, 215, 215';
$v_{fi}$ = inlet flow velocity, 214, 214';
$v_{re}$ = outlet relatively velocity of the air flow, 228;
$v_e$ = outlet relative velocity of fluid, 218, 218';
$u_{wi}$ = rotor velocity before entering the thrust flap 7, 224; and
$u_{we}$ = rotor velocity after exiting the thrust flap 7, 217.

FIG. 15

Back pressure effects. When the back pressure is less than the throat value, the thrust flap is said to be under-expanded. When the back pressure is greater than the throat value the thrust flap 7 is said to be over-expanded. The back pressure is measured by sencors 229 located at the extreme end of the aerofoil 8.

a. When the back pressure is larger than the throat pressure the nozzle overexpands and the mass flow is below maximum. A sensor 230 is measuring the pressure at the throat 7'. The exit pressure is greater than the critical pressure at the throat and the effect is reduction of the mass flow through the thrust flap;

b. when the back pressure $p_b$ is equal the throat pressure $p_c$ the thrust flap 7 is chocked, i.e. mass flow is maximum;

c. when the back pressure is smaller than the throat pressure $p_c$ the thrust flap is under-expanded and the expansion down to $p_b$ occurs outside the thrust flaps with the possibility of shock waves being produced; and d. when the $p_b$ is larger than the selective throat pressure $p_c$ the sensors detect the difference and adjust the throat area gap 226. The gap can be adjusted automatically or manually to succeed maximum flow to pass under the thrust flaps. Here it should be mentioned that any of the well known sensor devices and automatic control mechanisms and/or well known manners for controlling the throat of the thrust flap may be employed. Such devices form no part of the present invention. From the foregoing, it will be seen that the present invention provides a wing turbine, an independent turbine or/and turbine engine systems whereby an aircraft is propelled through a combination of jet thrust and wing thrust that is readily adaptable to any multi-purpose aircraft, either military or commercial.

PROPULSION OF HELICOPTERS BY MEANS OF HORIZONTAL INDEPENDENT TURBINE

Figure 23:
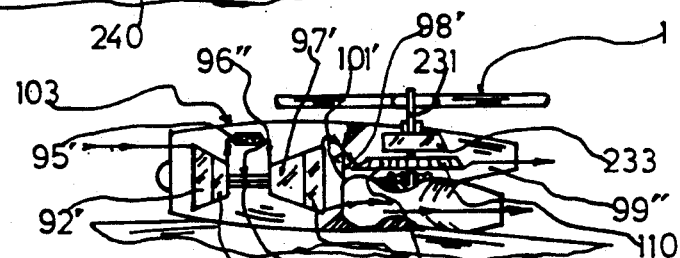
FIG. 23 is a perspective view of an horizontal independent turbine with jet nozzle for helicopter propulsion.

FIG. 23 illustrates in schematic view a horizontal turbine located between the stator vanes 98' and the exhaust nozzle 99' of the jet engine 103'. The jet engine 103' includes:

a. a two stage compressor which consists of a first stage compressor 92' attached to the shaft 90' driven by the low pressure turbine 91' and a second stage high pressure compressor 94' attached to the shaft 96" driven by the multi-stage high-pressure turbine 97';

b. a combustion chamber 95' intermediate to the multi-stage compressor 94' and the multi-stage turbine 97'; and c. the low pressure turbine 91' which supplies air to the horizontal turbine 110', through a bypass device 101' located between the stator vanes 98' and the low pressure turbine. A number of conventional bypass devices can be used to direct the exhaust gases to the independent turbine. The horizontal turbine 110' can be of the multi-stage if the helicopter is not designed to achieve high speeds but to lift heavy loads. The horizontal turbine 110' is connected to the rotor 1' by means of shafting 231. The mechanical output of the independent turbine 110' drives the rotor 1'. The bypass mechanism directs the exhaust gases through guide vanes to drive the horizontal turbine 110' and discharge through the nozzle 99". The shafting 231 passes through the stator 232. The housing 233 of the gear reduction and change of pitch is preferrably located above the horizontal turbine 110'.

Figure 21:
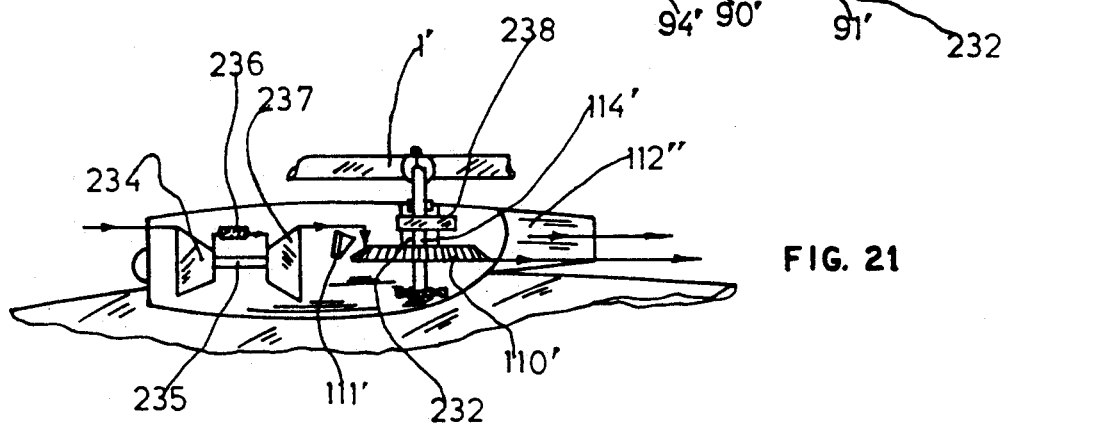
FIG. 21 is a perspective view of an horizontal independent turbine for helicopter propulsion.
Figure 24:
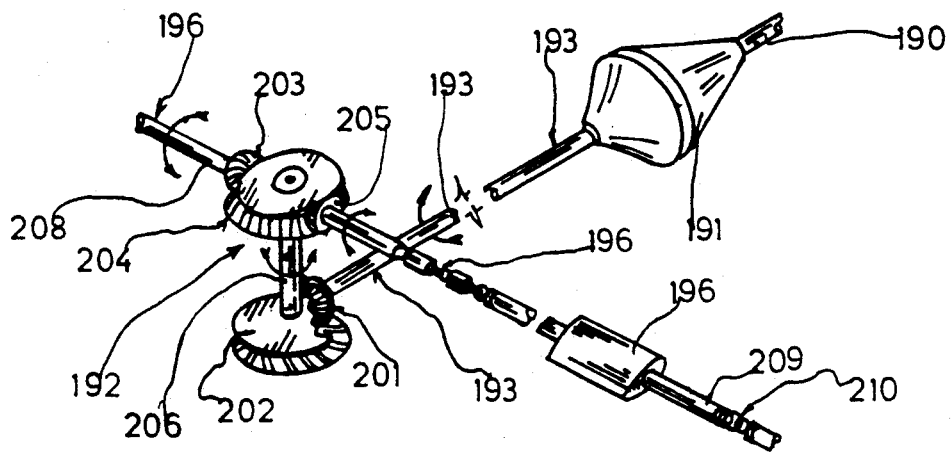
FIG. 24 is a schematic view to illustrate an arrangement of bevel gears provided for driving the rotors.

FIG. 21 illustrates in schematic view a horizontal independent turbine designed for helicopter propulsion, having a single exhaust nozzle, including:

a. a multi-stage compressor which consists of low and high pressure compressing blades. The multi-stage compressor 234 attached to the shaft 235 driven by the multi-stage turbine 237;

b. a combustion chamber 236 intermediate to the multi-stage compressor 234 and the multi-stage turbine 237; and c. the multi-stage turbine 237 which supplies exhaust gases to the horizontal turbine 110' through the horizontal vanes 111'. The exhaust gases are driving the horizontal turbine 110', the exhaust gases discharge through a exhaust nozzle 112". The horizontal independent turbine 110' is in driving connection by shafting 114' to the rotor 1'. A single-stage horizontal turbine 110' is preferably designed for the power plant of a helicopter for the achievement of high speed while the design of a multi-stage horizontal turbine 110' is for lifting heavy loads. The shafting 114' is linked with a change of pitch gearing or hydraulic mechanism and/or with a reduction gear box for the rotor 1', the latter being encased within a housing 238. The exhaust gases discharged from the burner 236 are driving the multi-stage high pressure turbine 237 and the horizontal independent turbine 110'.

Figure 22:
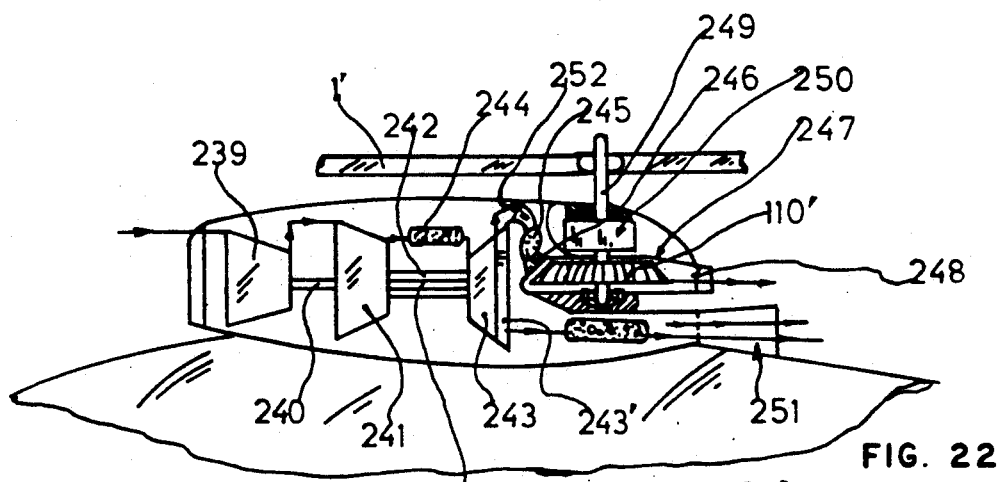
FIG. 22 is a perspective view of an horizontal independent turbine with divided exhaust nozzles for helicopter propulsion.

FIG. 22 illustrates in schematic view a horizontal turbine equipped with a burner and a second thrust nozzle.

a. A two stage compressor which consists of a first stage compressor 239, attached to the shaft 240, driven by the muti-stage low pressure turbine 243' and a second stage, high pressure compressor 241, driven by the high pressure turbine 243 by means of the shaft 242;

b. a combustion chamber 244 intermediate to the multi-stage high pressure compressor 241 and the high pressure turbine 243. A second combustion chamber 245 intermediate to the low pressure turbine 243' and the independent turbine 110';

d. the exhaust gases from the high pressure turbine 243 entering the second burner through a bypass device and through the guide vane 246 driving the independent turbine 110'. The independent turbine 110' is located horizontally in the housing 247 having a nozzle 248 for the exhaust gases. The mechanical output of the turbine 110' is driving the rotor 1' through the shafting 249. The shafting 249 is in connection with the reduction gearing and change of pitch mechanism located in the housing 250; and e. the high pressure turbine 243 discharges the gases into two streams. The first stream is taken into the multi-stage turbine 243' and discharged through the propulsion nozzle 251. The second stream resulting from the devided output of the high pressure turbine 243 passed through a throttling or bypass mechanism 252, deviating an amount of exhaust gases supplied to the independent turbine 110'. The bypass mechanism 252 is intermediate to the second burner 245 and the horizontal turbine 110'. Here it may be mentioned that any of the well known change of pitch mechanisms and reduction gearing boxes and/or well known manners for controlling the rotor may be employed, and such forming no part of the present invention, have not been herein illustrated.

PREFERRED AND/OR POSSIBLE APPLICATIONS OF THE WING & INDEPEDENT TURBINE

FIG. 18 illustrates in a schematic view a single turbine engine aircraft 253, equipped with wing turbines 3 supported at each wing tip 254 having rotors 1, 4. A vertical stabiliser 258 and rudder 257 is disposed on each wing tip above the wing turbine 3. A pivotable split nozzle 256, 256' is located and supported on the tail 257" of the fuselage frame. A small horizontal stabilizer is extending above tail 257' and between nozzles 256, 256'. The pivotable split nozzle assembled by means of a trapezoidal discharge-cone 256 supporting two pivotable thrust cones 256'. The turbine 255 can be of any kind of the described above in sections 1 through 8.

FIG. 19 illustrates in a schematic view a Delta shaped wings equipped with a wing turbine 3, supported at each wing tip 260 driven by two turbine engines 261, 262. The wing turbines 3 drive the rotors 1, 4. A vertical stabilizer 263 and rudder 264 are placed on each wing tip above the wing turbine 3. A second vertical stabilizer 267 is located above the tail of the aircraft 267'. Two pivotable thrust nozzles 261', 262' are located between the fuselage 268 and below the trailing edge of the Delta wing 2'. FIG. 20 illustrates in schematic view of a S.T.O.L. aircraft 269 equipped with a wing turbine at each wing tip driven by any kind of turbine engines specified in sections 1 to 6 in the above specification and an turbine engine preferrably indepedent at the tail of the aircraft. The wing turbine 3 is driving the rotors 1, 4. A vertical stabilizer 270 is located above the tail of the aircraft 269. Two pivotable thrust nozzles 273, 274 are located at the tail 271 of the aircraft 269. The rudder 275' is extended above the pivotable nozzles 273, 274 to hold the rudder 275'

The turbine engines 275, 276 are in connection and driving the wing turbines 3. The turbine engines can be of any kind specified in the above description in sections 1 through 9. A ducted-turbine unit of the dual-propulsion system has been illustrated. Each of the two wings of the aircraft may be provided with such as ducted-turbines and turbine engines. Each of the two wings of the aircraft may be provided with such ducted-turbines placed horizontally in the thickness of the wing 2. The jet engines in this case 275, 276, 277 provide the major amount of propulsion in the normal way when the aircraft is in forward flight. For take-off and landing, the jet exhaust is deflected to drive the rotors 1, 4 through the ducted-turbine in the wing. If the wings are equipped with thrust flaps then an additional wing thrust is provided. The thrust flaps are more efficient than jet thrust at low speed.

While I have described my invention in detail in its present preferred embodiment, it will of course be understood that I have done so for the purpose of illustration only and not for the purpose of limitation, and therefore only such limitations are to be imposed thereon as may come within the scope of the appended claims.

I claim:

1. A propolsion system for an aircraft having a wing, comprising a power plant, an exhaust gas accelerator and a wing-turbine;

said power plant comprising a high pressure turbine connected to and driving a high pressure multi-stage compressor and a low pressure multi-stage compressor, a combustion chamber intermediate said high pressure multi-stage compressor and said high pressure turbine;

said exhaust gas accelerator is formed in a divergent-convergent nozzle receiving an exhaust gas exiting from said combustion chamber and said high pressure turbine by means of a second combustion chamber, said exhaust gas discharging from said second combustion chamber and driving a third stage low pressure turbine;

said third stage low pressure turbine connected to and driving an independent turbine, said third stage low pressure turbine and said independent turbine located in said divergent-convergent nozzle, said third stage low pressure turbine is powered by means of said exhaust gas discharging from said high pressure turbine, and said second combustion chamber;

said exhaust gas by means of said independent turbine providing a propulsion thrust, said propulsion thrust powers said aircraft;

said second combustion chamber supported between said high pressure turbine and said third stage low pressure turbine; said power plant is not axially connected to said third stage low pressure turbine;

said wing-turbine and a multiple combustion burner ports connected to a bypass duct mechanism, said bypass duct mechanism located before said multi-stage high pressure compressor; said wing-turbine connected to and driving a rotor, said wing-turbine is supported in a wing tip of said wing, said rotor is rotating parallel under said wing;

said wing-turbine supported in a housing, said multiple combustion burner ports directly attached to said housing; said multiple combustion burner ports supported between said bypass duct mechanism and said wing-turbine;

said housing is embodied with a propulsion nozzle extending along to a trailing edge of said wing tip, said propulsion nozzle forms said trailing edge of said wing-tip; said propulsion nozzle is a continuation of said housing for discharging a propulsion gas, said propulsion gas provides an additional propulsion thrust;

said wing turbine provides lift by means of said rotor and said additional propulsion thrust by means of said propulsion nozzle.

2. A propulsion system providing a combination of a vertical and a propulsion thrust comprising a wing-turbine driving a rotor, a wing equipped with thrust-flaps and a jet engine;

said jet engine formed by means of a combination of a low pressure multi-stage compressor and a high pressure multi-stage compressor, a high pressure multi-stage turbine connected to and driving said low pressure multi-stage compressor and said high pressure multi-stage compressor, a combustion chamber of an annular vaporise type indermediates said high pressure multi-stage compressor and said high pressure multi-stage turbine, providing said propulsion thrust;

said wing-turbine horizontally supported in a housing, said housing is located in a wing-tip of said wing, said wing-turbine connected to and driving said rotor;

said rotor rotating under said thrust-flaps, said wing turbine coaxially connected to a turbine brake and said rotor;

a radial burner by means of a throttling device receives part of a divided air output discharging from said low pressure multi-stage compressor, said divided air output leaves said radial burner as an exhaust gas, said exhaust gas under pressure discharged to said wing-turbine;

said throttling device mounted between said low pressure multi-stage compressor and said high pressure multi-stage compressor;

said exhaust gas powers said wing-turbine, said exhaust gas provides said propulsion thrust by means of an elongated nozzle extending partly along a trailing edge of said wing tip; and said elongated exhaust nozzle forms part of said housing;

said thrust-flaps supported at a lower camber of said wing, said thrust-flaps are forming part of said lower camber of said wing, said thrust-flaps are located in a first position and in a second position;

said thrust-flaps, in said first position are coextensive with said lower camber of said wing;

in said second position said thrust flaps are forming an open nozzle at said lower camber having a throat gap created by the rotation of said rotor; said open nozzle created by means of an angular displacement of said thrust-flaps located in said second position.

3. A V.T.O.L. aircraft having: a thrust-lift wing-turbine and a turbine engine as a propulsion systems for said V.T.O.L. aircraft, comprising:

a wing having a lower camber equipped by means of an aerodynamic composite airfoil, said aerodynamic composite airfoil is forming a thrust-flap;

said thrust-flap altering said lower camber of said wing, when said thrust-flap is positioned in a first configuration substantially coinciding with said lower camber; when said thrust-flap is positioned in a second configuration said thrust-flap projected below said lower camber to form a convergent-divergent nozzle under said wing, said convergent-divergent nozzle having a throat gap opening projected towards said rotor, said throat gap opening with respect to said rotor selectively regulated according to an angular position of said thrust flap;

said throat gap opening extends along the span of said thrust-flap;

in said first configuration said rotor provides a primary lift when said thrust-flap is coextensive with said lower camber;

in said second configuration said thrust-flap cooperable with said rotor provide a propulsion thrust and said primary lift, said rotor compresses said airflow under said thrust-flap to generate said propulsion thrust;

said airflow compressed at said throat gap and expands at said convergent-divergent nozzle and at said rotor; said rotor driven by means of said wing-turbine, said wing turbine regulates said rotor velocity, said wing turbine is supported in a housing at a wing tip of said wing;

said turbine engine, includes;

a low pressure multi-stage compressor and a high pressure multi-stage compressor driven by a high pressure multi-stage turbine and a low pressure multi-stage turbine, said low pressure multi-stage compressor has a dual air supply;

said dual air supply directed through a combustion chamber to said high pressure multi-stage turbine, said low pressure multi-stage turbine and partly discharges through a radial burner to said wing-turbine;

said combustion chamber located between said high pressure multi-stage compressor and said high pressure multi-stage turbine;

said housing forms part of said wing-tip, said housing is connected to said radial burner and to an elongated exhaust nozzle, said exhaust nozzle extends along a trailing edge of said wing-tip;

said radial burner is mounted at said housing, said radial burner covers only part of said housing.

4. A propulsion turbine system is a combination of assemblies of a wing-turbine connected to a turbine brake and a rotor for an aircraft having a wing equipped with thrust-flaps, comprising:

said wing equipped with the aerodynamic composite airfoil means at a lower camber of said wing, said aerodynamic composite airfoil means form said thrust-flaps, said thrust flaps altering a curvature of said lower camber between a first configuration and a second configuration;

in said first configuration said aerodynamic composite airfoils coincide with said curvature for said lower camber; said thrust flaps substantially form part of said lower camber of said wing;

in said second configuration said thrust-flaps projected downwardly altering said curvature to form a nozzle; said nozzle having a throat-gap formed by means of said thrust-flaps;

said rotor connected to and driven by means of said wing-turbine, said wing-turbine controls said rotor velocity, said rotor rotating parallel under said throat-gap;

said rotor providing a primary lift when said thrust-flaps are in said first configuration;

when said thrust-flaps are in said second configuration, said rotor by means of said thrust-flaps providing said primary lift and a propulsion thrust;

said rotor compresses an airflow at said nozzle, said airflow expands at said throat-gap to provide said propulsion thrust;

said turbine-brake stops the rotation of said rotor when no power is provided to said wing-turbine, said turbine-brake stops said rotor parallel under said thrust-flaps when said speed of said aircraft is high;

said propulsion turbine system provides a main propulsion thrust for said aircraft by means of a high pressure multi-stage turbine and a low pressure multi-stage turbine, said main propulsion thrust is independent to said propulsion thrust produced by said wing-turbine, said propulsion turbine system is equipped with a throttling mechanism located between a low pressure multi-stage compressor and a high pressure multi-stage compressor, said high pressure multi-stage turbine and said low pressure multi-stage turbine are connected and driving said high pressure multi-stage compressor and said low pressure multi-stage compressor;

said throttling mechanism regulates an air intake to said wing-turbine, said air intake is stopped by said throttling mechanism when said turbine brake is applied.

5. A propulsion turbine system according to claim 4; wherein said wing-turbine, said rotor and said turbine-brake are coaxially connected to a reduction gear box, said reduction gear box is located above said wing-turbine, said rotor is equipped with fixed pitch blades;

said fixed pitch blades are held parallel under said wing by means of said turbine-brake when said speed of said aircraft is high and said thrust-flaps are maintained in said first configuration.

* * * * *